(12) United States Patent
Moriya et al.

(10) Patent No.: US 6,691,074 B1
(45) Date of Patent: Feb. 10, 2004

(54) SYSTEM FOR THREE DIMENSIONAL POSITIONING AND TRACKING

(75) Inventors: Netzer Moriya, Ramat Hasharon (IL); Harel Primak, Rishon Le Zion (IL); Moti Itzkovich, Petach Tikva (IL)

(73) Assignee: Netmore Ltd., Ramat Hasharon (IL)

( * ) Notice: Subject to any disclaimer, the term of this patent is extended or adjusted under 35 U.S.C. 154(b) by 212 days.

(21) Appl. No.: 09/778,718

(22) Filed: Feb. 8, 2001

(51) Int. Cl.[7] ............................................. H03F 1/26
(52) U.S. Cl. .................................. 702/190; 702/190
(58) Field of Search ..................... 702/190; 342/457; 607/30; 340/573; 600/543; 360/78.07; 356/141.1; 701/207

(56) References Cited

U.S. PATENT DOCUMENTS

| | | |
|---|---|---|
| 3,644,825 A | 2/1972 | Davis, Jr. et al. |
| 3,868,565 A | 2/1975 | Kuipers |
| 3,935,572 A | 1/1976 | Broniwitz et al. |
| 3,952,304 A | 4/1976 | Broniwitz et al. |
| 3,983,474 A | 9/1976 | Kuipers |
| 4,017,858 A | 4/1977 | Kuipers |
| 4,054,881 A | 10/1977 | Raab |
| 4,179,696 A | 12/1979 | Quesinberry et al. |
| 4,287,809 A | 9/1981 | Egli et al. |
| 4,298,874 A | 11/1981 | Kuipers |
| 4,314,251 A | 2/1982 | Raab |
| 4,328,548 A | 5/1982 | Crow et al. |
| 4,346,384 A | 8/1982 | Raab |
| 4,394,831 A | 7/1983 | Egli et al. |
| 4,396,885 A | 8/1983 | Constant |
| 4,506,979 A | 3/1985 | Rogers |
| 4,613,866 A | 9/1986 | Blood |
| 4,622,644 A | 11/1986 | Hansen |
| 4,642,786 A | 2/1987 | Hansen |
| 4,710,708 A | 12/1987 | Rorden et al. |
| 4,737,794 A | 4/1988 | Jones |
| 4,742,356 A | 5/1988 | Kuipers |
| 4,849,692 A | 7/1989 | Blood |

(List continued on next page.)

FOREIGN PATENT DOCUMENTS

| | | |
|---|---|---|
| WO | WO 94/04938 | 3/1994 |
| WO | WO 96/05768 | 2/1996 |

OTHER PUBLICATIONS

Best, "Phase–Locked Loops: Design, Simulation, and Applications", Table of Contents, 1989, McGraw Hill Books Co., ISBN: 0–07–134903–0.

(List continued on next page.)

*Primary Examiner*—John Barlow
*Assistant Examiner*—Tung Lau
(74) *Attorney, Agent, or Firm*—Nixon & Vanderhye, P.C.

(57) ABSTRACT

A system for tracking and positioning a moving object, the system including a plurality of transmitters operative to transmit alternating electromagnetic fields within a three-dimensional space and at least one sensor arranged to be fixed to at least one corresponding portion of a moving object whose position it is sought to monitor. Each of said at least one sensors includes an electromagnetic field receiver having at least one active axis and operative to receive at least one component, lying along the at least one active axis respectively, of the alternating electromagnetic fields, an accelerometer to independently measure at least one component of the acceleration of the moving object; and a digital signal processor. The digital signal processor is adapted to store at least one characteristic of the electromagnetic fields as received by the electromagnetic field receiver, and at least one characteristic of the acceleration as measured by the accelerometer, and to transmit the stored characteristics to a Kalman filter, and to compute therefrom an estimate of at least one component of the position and orientation of the moving object.

26 Claims, 17 Drawing Sheets

U.S. PATENT DOCUMENTS

| | | |
|---|---|---|
| 4,855,932 A | 8/1989 | Cangiani et al. |
| 4,945,305 A | 7/1990 | Blood |
| 5,051,751 A | 9/1991 | Gray |
| 5,075,694 A | 12/1991 | Donnangelo et al. |
| 5,095,467 A | 3/1992 | Olson et al. |
| 5,168,222 A | 12/1992 | Volsin et al. |
| 5,170,172 A | 12/1992 | Weinstein |
| 5,172,056 A | 12/1992 | Voisin |
| 5,272,639 A * | 12/1993 | McGuffin .................. 701/207 |
| 5,307,072 A | 4/1994 | Jones, Jr. |
| 5,377,678 A | 1/1995 | Dumoulin et al. |
| 5,416,712 A | 5/1995 | Geier et al. |
| 5,453,686 A | 9/1995 | Anderson |
| 5,515,865 A * | 5/1996 | Scanlon ..................... 600/534 |
| 5,558,091 A | 9/1996 | Acker et al. |
| 5,592,401 A | 1/1997 | Kramer |
| 5,592,939 A | 1/1997 | Martinelli |
| 5,600,330 A | 2/1997 | Blood |
| 5,615,116 A | 3/1997 | Gudat et al. |
| 5,615,132 A | 3/1997 | Horton et al. |
| 5,640,170 A | 6/1997 | Anderson |
| 5,645,077 A | 7/1997 | Foxlin |
| 5,657,226 A | 8/1997 | Shin et al. |
| 5,668,680 A * | 9/1997 | Tremaine ................. 360/78.07 |
| 5,684,460 A * | 11/1997 | Scanlon ................... 340/573.1 |
| 5,742,394 A | 4/1998 | Hansen |
| 5,744,953 A | 4/1998 | Hansen |
| 5,767,669 A | 6/1998 | Hansen et al. |
| 5,767,960 A | 6/1998 | Orman |
| 5,831,260 A | 11/1998 | Hansen |
| 5,902,351 A | 5/1999 | Streit et al. |
| 5,930,741 A | 7/1999 | Kramer |
| 5,953,683 A | 9/1999 | Hansen et al. |
| 5,956,250 A | 9/1999 | Gudat et al. |
| 5,982,480 A * | 11/1999 | Itzkovich et al. ......... 356/141.1 |
| 5,991,692 A | 11/1999 | Spencer, II et al. |
| 6,014,103 A * | 1/2000 | Sumner et al. ............. 342/457 |
| 6,073,043 A | 6/2000 | Schneider |
| 6,083,248 A * | 7/2000 | Thompson ................... 607/30 |
| 6,141,293 A | 10/2000 | Amorai-Moriya et al. |

OTHER PUBLICATIONS

Klapper et al, "Phase–Locked and Frequency–Feedback Systems:Principles and Techniques", pp. 225–264, 1972, Academic Press, N.Y.

Baxter, "Capacitive Sensors:Design and Applications", IEEE Press Series on Electronics Technology, Table of Contents, 1997, IEEE Press Marketing, Piscataway, NJ.

Jackson, "Classical Electrodynamics", John Wiley & Sons, $2_{nd}$ Edition, New York, 1975, Chapter 6, pp. 209–268.

Anderson et al, "Optimal Filtering", Table of Contents, pp. v–x, Prentice–Hall, Inc., Englewood Cliffs, NJ 1979.

Jazwinski, "Stochastic Processes and Filtering Theory", Academic Press, NY, 1970, Table of Contents, pp. xi–xiv.

Kushner, "Approximations to Optimal Nonlinear Filters", IEEE Transactions on Automated Control pp. 546–556, vol. AC–21, No. 5, Oct. 1967.

Gelb, "Applied Optimal Estimation", Table of Contents, The MIT Press, Cambridge, MA, 1974.

Grewal et al, Table of Contents, pp. v–xiv, "Kalman Filtering", Prentice–Hall, NJ, 1993.

U.S. patent application Ser. No. 09/384,314, filed Aug. 1999.

U.S. patent application Ser. No. 09/345,189, filed Jun. 1999.

U.S. patent application Ser. No. 09/503,436, filed Feb. 2000.

* cited by examiner

VIRTUAL from 1222

1225 Use measured $\zeta_k$ (Voltages) to calculate the corrected state vector predictions based on measurements $$\xi_k(+) = \xi_k(-) + \mathbf{K}_k \{\zeta_k - h[\xi_k(-)]\}$$

1230 Correct error covariance matrix predictions based on measurements $$\mathbf{P}_k(+) = [\mathbf{I} - \mathbf{K}_k \mathbf{H}_k] \mathbf{P}_k(-)$$

1245 Update time varying matrices $$Q_k^{dec} = Q_{k+1}^{dec} e^{-\frac{T_k - T_{k-1}}{\tau_{decay}}} \qquad Q_k = Q_k^{dec} + Q^{inf}$$

$$R_k^{dec} = R_{k+1}^{dec} e^{-\frac{T_k - T_{k-1}}{\tau_{decay}}} \qquad R_k = R_k^{dec} + R^{inf}$$

1255 Self calibration of hardware attributes e.g. transmitter's intensity. Use self calibration information e.g. $C_0$ from state vector, to update values inside H computations $$\xi = x, y, z, \phi, \theta, \psi, \dot{x}, \dot{y}, \dot{z}, \dot{\phi}, \dot{\theta}, \dot{\psi}, \ddot{x}, \ddot{y}, \ddot{z}, \ddot{\phi}, \ddot{\theta}, \ddot{\psi}, C_1, \ldots, C_N$$

$$\Phi = \begin{bmatrix} \Phi_{coor} & 0 \\ 0 & \Phi_{sc} \end{bmatrix} \quad H_k = [H_{coor} \quad H_{sc}] \quad Q = \begin{bmatrix} Q_{coor} & 0 \\ 0 & Q_{sc} \end{bmatrix}$$

$$\xi = x, y, z, \phi, \theta, \psi, \dot{x}, \dot{y}, \dot{z}, \dot{\phi}, \dot{\theta}, \dot{\psi}, \ddot{x}, \ddot{y}, \ddot{z}, \ddot{\phi}, \ddot{\theta}, \ddot{\psi}, \phi^s_1, \ldots, \phi^s_N$$

from 2222

2225 Use measured $\zeta_k$ (Voltages) to calculate the corrected state vector predictions based on measurements $$\xi_k(+) = \xi_k(-) + \mathbf{K}_k \{\zeta_k - h[\xi_k(-)]\}$$

2230 Correct error covariance matrix predictions based on measurements $$\mathbf{P}_k(+) = [\mathbf{I} - \mathbf{K}_k \mathbf{H}_k]\mathbf{P}_k(-)$$

Update time varying matrices $$Q_k^{dec} = Q_{k+1}^{dec} e^{\frac{T_k - T_{k-1}}{\tau_{decay}}} \qquad Q_k = Q_k^{dec} + Q^{inf}$$

2245

$$R_k^{dec} = R_{k+1}^{dec} e^{\frac{T_k - T_{k-1}}{\tau_{decay}}} \qquad R_k = R_k^{dec} + R^{inf}$$

Self calibration of hardware attributes e.g. transmitter's intensity. Use self calibration information e.g. $C_0$ from state vector, to update values inside H computations $$\xi = x, y, z, \phi, \theta, \psi, \dot{x}, \dot{y}, \dot{z}, \dot{\phi}, \dot{\theta}, \dot{\psi}, \ddot{x}, \ddot{y}, \ddot{z}, \ddot{\phi}, \ddot{\theta}, \ddot{\psi}, C_1, ..., C_N$$

2255

$$\Phi = \begin{bmatrix} \Phi_{coor} & 0 \\ 0 & \Phi_{sc} \end{bmatrix} \qquad H_k = [H_{coor} \quad H_{sc}] \qquad Q = \begin{bmatrix} Q_{coor} & 0 \\ 0 & Q_{sc} \end{bmatrix}$$

$$\xi = x, y, z, \phi, \theta, \psi, \dot{x}, \dot{y}, \dot{z}, \dot{\phi}, \dot{\theta}, \dot{\psi}, \ddot{x}, \ddot{y}, \ddot{z}, \ddot{\phi}, \ddot{\theta}, \ddot{\psi}, \phi^s{}_1, ..., \phi^s{}_N$$

SYSTEM FOR THREE DIMENSIONAL POSITIONING AND TRACKING

RELATED APPLICATIONS

This application may be related to (1) U.S. patent application Ser. No. 09/384,314, filed Aug. 27, 1999, LOCALIZATION AND TRACKING SYSTEM; (2) U.S. patent application Ser. No. 09/345,189, filed Jun. 30, 1999, A SYSTEM FOR THREE DIMENSIONAL POSITIONING AND TRACKING; (3) U.S. patent Application Ser. No. 09/503,436, filed Feb. 14, 2000, A SYSTEM FOR THREE DIMENSIONAL POSITIONING AND TRACKING WITH DYNAMIC RANGE EXTENSION.

REFERENCE TO COMPUTER PROGRAM LISTING APPENDIX

Computer program listing appendices are submitted herewith on one compact disc and one duplicate compact disc. The total number of compact discs including duplicates is two. The files on the compact disc are ASCII text files in which the characters are displayed as their corresponding values in hexadecimal format. Their names, dates of creation, directory locations, and sizes in bytes are:

1. Directory appndxI containing file 36725aI.HEX (Appendix I) of Jan. 16, 2001 and of length 55,519 bytes.
2. Directory appndxII containing file 36725aII.HEX (Appendix II) of Jan. 16, 2001 and of length 8,260 bytes.

The files are referred to herein as appendices I and II respectively. The material on the compact discs is incorporated by reference herein.

FIELD OF THE INVENTION

The present invention relates generally, to positioning systems and more particularly to positioning systems employing alternating electromagnetic fields and acceleration measurements, as well as to an apparatus for localization and tracking using an extended Kalman filter.

BACKGROUND OF THE INVENTION

Various types of positioning systems which employ alternating electromagnetic fields are known. The following U.S. Patents and foreign patent documents are believed to represent the state of the art for positioning systems:

U.S. Pat. Nos. 4,054,881 and 4,314,251 to Raab; U.S. Pat. Nos. 4,622,644, 4,642,786, 5,742,394, 5,744,953, 5,767,669, 5,831,260 and 5,953,683 to Hansen; U.S. Pat. No. 4,737,794 to Jones; U.S. Pat. Nos. 4,613,866, 4,945,305 and 4,849,692 to Blood; U.S. Pat. Nos. 3,868,565, 3,983,474, 4,017,858, 4,298,874 and 4,742,356 to Kuipers; U.S. Pat. Nos. 5,168,222 and 5,172,056 to Volsin et al; U.S. Pat. No. 5,0170,172 to Weinstein; U.S. Pat. Nos. 5,453,686 and 5,640,170 to Anderson; U.S. Pat. No. 5,767,960 to Orman; U.S. Pat. No. 5,600,330 to Blood; U.S. Pat. No. 5,307,072 to Jones; U.S. Pat. No. 4,710,708 to Rorden; U.S. Pat. No. 4,346,384 to Raab; U.S. Pat. No. 4,328,548 to Crow; U.S. Pat. No. 5,558,091 to Acker; U.S. Pat. No. 5,592,939 to Martinelli; U.S. Pat. No. 6,073,043 to Schnieder; U.S. Pat. No. 3,644,825 to Davis; U.S. Pat. No. 5,377,678 to Dumoulin; U.S. Pat. Nos. 4,287,809 and 4,394,831 to Egli; U.S. Pat. No. 4,396,885 to Constant WO 96/05768 to Ben-Haim and WO 94/04938 to Bladen;

U.S. Pat. No. 4,710,708 to Rorden describes a positioning system which employs only one electromagnetic coil.

A description of accelerometer technology may be found in *Capacitive Sensors*, L. K. Baxter, 1998 ISBN 0-7803-5351-X;

U.S. Pat. No. 5,592,401 to Kramer, U.S. Pat. No. 5,657,226 to Shin, U.S. Pat. No. 5,615,116 to Gudat, U.S. Pat. No. 5,615,132 to Horton, U.S. Pat. No. 5,956,250 to Gudat, U.S. Pat. No. 5,902,351 to Streit, U.S. Pat. No. 5,991,692 to Spencer, U.S. Pat. No. 4,506,979 to Rogers, U.S. Pat. No. 5,051,751 to Gray and U.S. Pat. No. 5,930,741 to Kramer, all describe positioning systems which may employ Kalman filtering and acceleration measurements.

Phase Locked Loop technology is described in "Phase locked loop: simulation and applications", by Roland E. Best, McGraw-Hill Book Company, ISBN 0070060517.

The theory of non-linear filtering and its applications is discussed in:

H. J. Kushner, "Approximations to Optimal Nonlinear Filters". IEEE Trans. A.C., Vol. AC-12, No. 5, October 1967;

A. Gelb, J. F. Kaspar, Jr., R. A. Nash, Jr., C. E. Price, and A. A. Southerland, Jr., "Applied Optimal Estimation", M.I.T. Press, Cambridge, Mass., 1974;

B. D. O. Anderson, and J. B. Moore, "Optimal Filtering", Prentice-Hall, Englewood Cliffs, N.J., 1979;

A. H. Jazwinski, "Stochastic Processes and Filtering Theory", Academic Press, New York, 1971; and M. S. Grewal, and A. P. Andrews, "Kalman Filtering", Prentice-Hall, Upper Saddle River, N.J., 1993.

The Electromagnetic field equation laws are discussed in:

J. D. Jackson, "Classical Electrodynamics", John Wiley & Sons, New York, New York, 1975.

The application of Extended Kalman filters (EKF) to tracking in the context of radar is discussed, for example, in U.S. Pat. Nos. 5,075,694, 4,179,696, 3,952,304 and 3,935,572. Other tracking systems are discussed, for example, in U.S. Pat. Nos. 5,095,467 and 4,855,932.

The Kalman filter is a standard tool for "data fusion" of different sensors. In U.S. Pat. No. 5,416,712, Global Positioning System (GPS) signals and dead reckoning are combined by a Kalman filter, where the gyro bias is also calibrated. In U.S. Pat. No. 5,645,077 automatic drift compensation is discussed.

Reference is also made to positioning and tracking systems described in the following U.S. patent and patent applications assigned to the assignee of the present invention, which are herein incorporated each in its entirety, by reference. U.S. Pat. No. 6,141,293 to Moriya at el.; U.S. patent application Ser. No. 09/345,189 entitled "A system and method for three dimensional positioning and tracking", filed on Jun. 30, 1999 to Moriya and Itzkovich; U.S. patent application Ser. No. 09/384,314 entitled "A localization and tracking system", filed on Aug. 27, 1999 to Moriya and Albeck; and U.S. patent application Ser. No. 09/503,436 entitled "A system for three dimensional positioning and tracking with dynamic range extension", filed on Feb. 14, 2000 to Moriya.

The disclosures of all publications mentioned in the specification are hereby incorporated in their entirety by reference.

SUMMARY OF THE INVENTION

Preferred embodiments of the present invention provide an improved apparatus and method for positioning and tracking objects, particularly using a non-linear Kalman Filter tracker, where electromagnetic field data and acceleration information are used simultaneously for the determination of the position and orientation of a remote sensing device.

An acceleration measuring device is typically used to provide acceleration information of the moving object. A particular advantage of a preferred embodiment of the present invention is the fusion of the acceleration information in the tracking in order to increase the location, i.e. position and orientation, accuracy.

In a preferred embodiment of the present invention, the axial rotation of a probe sensor around at least one direction in space can be monitored.

Preferably, a periodic comparison between the position data based on electromagnetic field information and both electromagnetic and acceleration data is obtained. The results of the comparison is then used in order to indicate electromagnetic disturbances in the operating environment.

Preferably, a system constructed and operative in accordance with a preferred embodiment of the present invention comprises N transmitters and M receiving elements in the probe sensor which detects at least 6 electromagnetic signals, each of the transmitters is characterized by its own frequency and at least one linear multi-axial acceleration detector which detects the actual acceleration components in the direction perpendicular to its prime axis that are connected to a digital signal processing circuit. The analog output of the electromagnetic signal detector is a voltage signal proportional to the superposition of the N electromagnetic field transmitters at the coordinates $x^i$, $y^i$, $z^i$ $\phi^i$, $\theta^i$, and $\psi$ where the index i denotes the position of the electromagnetic source i. The output of the acceleration detecting components are voltage signals which are functions of the actual acceleration components in the direction perpendicular to its prime axis.

It is a particular feature of a preferred embodiment of the present invention that the antenna coils need not be exactly mutually orthogonal and certainly need not be arranged such that the centers of the antenna coils coincide.

Preferably, analog signals of both electromagnetic field detectors and the acceleration components are digitized and are introduced to an integrated digital signal processor block, as an input data. The digitized input data from the sensor is then used by a digital signal processor, to compute the position and orientation coordinates of the sensor. The output from the digital signal processor is transferred to a data communication unit and then to a system control unit. The refresh rate of the output data is typically of the order of few times per second to a few hundred times per second.

The detector may comprise a multi-axial acceleration detector and at least one-axis antenna coil, and may alternatively comprise any other suitable type of one-axis electromagnetic field detector, such as a Hall-effect detector or a solid state component, e.g., a magneto-resistive detector or a magneto-diode or a magneto-transistor. The digital signal processor typically comprises two modules: an envelope detector module and a position determination unit.

The Envelope Detector (hereafter referred as "ED"), is operative to determine the received envelope amplitudes (magnitude and sign) $C^1, \ldots, C^N$ of the N electromagnetic signals received from the N Electromagnetic field transmitters. The ED is typically comprised of N identical envelope detectors working in parallel. Each of the ED modules preferably comprises two sub-modules: a phase lock loop (hereafter PLL), and a system synchronization unit, which is operative during the operation of the ED module to define the absolute sign of the signal amplitude. Alternatively, each ED module may comprise three sub-modules operating in parallel and another sub-module that is invoked when system synchronization is needed. The three modules are: a phase lock loop, a non-coherent absolute value envelope-detector, and a sign detection unit. A fourth sub-module, system synchronization unit, may be invoked to define the absolute sign of the signal amplitude.

The output of the envelope detector is supplied to a position determination unit which is operative, based on the signed amplitude values supplied by the envelope detector, to provide an output indication of the position of the electromagnetic field detector in the sensor.

There is thus provided in accordance with a preferred embodiment of the present invention a system for tracking and positioning a moving object, the system including a plurality of transmitters operative to transmit alternating electromagnetic fields within a three-dimensional space, and at least one sensor arranged to be fixed to at least one corresponding portion of a moving object whose position it is sought to monitor, each of the at least one sensors including an electromagnetic field receiver having at least one active axis and operative to receive at least one component, lying along the at least one active axis respectively, of the alternating electromagnetic fields, an accelerometer to independently measure at least one component of the acceleration of the moving object, and a digital signal processor adapted to store at least one characteristic of the electromagnetic fields as received by the electromagnetic field receiver, and at least one characteristic of the acceleration as measured by the accelerometer, and to transmit the stored characteristics to a Kalman filter, and to compute therefrom an estimate of at least one component of the position and orientation of the moving object.

Also in accordance with a preferred embodiment of the present invention the Kalman filter employs at least one estimate of an acceleration value's components in order to compute an estimate of the at least one component of the moving object's position and orientation and wherein the Kalman filter employs the at least one independently measured component of the acceleration of the moving object as the at least one estimated acceleration value's components, rather then deriving the at least one estimated acceleration value's components from the electromagnetic field information.

There is further provided in accordance with another preferred embodiment of the present invention a system for indicating a disturbance in an electromagnetic field, the system including a plurality of transmitters operative to transmit alternating electromagnetic fields within a three-dimensional space, and at least one sensor arranged to be fixed to at least one corresponding portion of a moving object whose position it is sought to monitor. Each of the at least one sensors includes an electromagnetic field receiver having at least one active axis and operative to receive at least one component, lying along the at least one active axis respectively, of the alternating electromagnetic fields, an accelerometer operative to independently measure at least one component of the acceleration of the moving object, and a digital signal processor for storing at least one characteristic of the electromagnetic fields as received by the electromagnetic field receiver, and at least one characteristic of the acceleration as measured by the accelerometer. The digital signal processor is adapted to transmit the at least one stored characteristic of the electromagnetic fields to a Kalman filter and calculate therefrom a first estimate of at least one component of the position and orientation of the moving object, transmit the at least one stored characteristics of the electromagnetic field and the at least one characteristic of the acceleration as measured by the accelerometer to the Kalman filter, and calculate therefrom a second estimate of at least one component of the position and orientation of the moving object, and compare the first and second estimates for a discrepancy indicating a disturbance in the electromagnetic field.

Further in accordance with a preferred embodiment of the present invention the digital signal processor compares the first and second estimates for a discrepancy indicating a disturbance in the electromagnetic field on a periodic basis.

Also in accordance with a preferred embodiment of the present invention, the Kalman filter calculating the second estimate of at least one component of the position and orientation of the moving object employs at least one estimate of an acceleration value's components in order to compute an estimate of the at least one component of the moving object's location and the Kalman filter employs the at least one independently measured component of the acceleration of the moving object as the at least one estimated acceleration value's components, rather then deriving the at least one estimated acceleration value's components from the electromagnetic field information.

There is further provided in accordance with another preferred embodiment of the present invention a method for tracking and positioning a moving object, the method including positioning a plurality of transmitters operative to transmit alternating electromagnetic fields within a three-dimensional space, affixing at least one sensor to at least one corresponding portion of the moving object whose position it is sought to monitor, each of the at least one sensors including an electromagnetic field receiver having at least one active axis and operative to receive at least one component, lying along the at least one active axis respectively, of the alternating electromagnetic fields, and an accelerometer operative to independently measure at least one component of the acceleration of the moving object, and storing at least one characteristic of the electromagnetic fields as received by the electromagnetic field receiver, and at least one characteristic of the acceleration as measured by the accelerometer, transmitting the stored characteristics to a Kalman filter, and computing therefrom an estimate of at least one component of the position and orientation of the moving object.

Still further in accordance with a preferred embodiment of the present invention the method includes employing at least one estimate of an acceleration value's components in order to compute an estimate of the at least one component of the moving object's position and orientation wherein the at least one independently measured component of the acceleration of the moving object is employed as the at least one estimated acceleration value's components, rather than deriving the at least one estimated acceleration value's components from the electromagnetic field information.

There is also provided in accordance with another preferred embodiment of the present invention a method for indicating a disturbance in an electromagnetic field, the method including positioning a plurality of transmitters operative to transmit alternating electromagnetic fields within a three-dimensional space, and affixing at least one sensor to at least one corresponding portion of a moving object whose position it is sought to monitor, each of the at least one sensors comprising an electromagnetic field receiver having at least one active axis and operative to receive at least one component, lying along the at least one active axis respectively, of the alternating electromagnetic fields, and an accelerometer operative to independently measure at least one component of the acceleration of the moving object, storing at least one characteristic of the electromagnetic fields as received by the electromagnetic field receiver, and at least one characteristic of the acceleration as measured by the accelerometer, transmitting the at least one stored characteristic of the electromagnetic fields to a Kalman filter and calculating therefrom a first estimate of at least one component of the position and orientation of the moving object, transmitting the at least one stored characteristics of the electromagnetic field and the at least one characteristic of the acceleration as measured by the accelerometer to the Kalman filter, and calculating therefrom a second estimate of at least one component of the position and orientation of the moving object, and comparing the first and second estimates for a discrepancy indicating a disturbance in the electromagnetic field.

Still further in accordance with a preferred embodiment of the present invention comparing first and second estimates for a discrepancy indicating a disturbance in the electromagnetic field occurs on a periodic basis.

Additionally in accordance with a preferred embodiment of the present invention a discrepancy indicating a disturbance in the electromagnetic field comprises a discrepancy of greater than the expected absolute accuracy of the measurement of the position and orientation of the moving object.

Further in accordance with a preferred embodiment of the present invention at least one component of the position of the moving object comprises at least two components.

Still further in accordance with a preferred embodiment of the present invention at least two components of the position of the moving object comprises three components.

Additionally in accordance with a preferred embodiment of the present invention at least one component of the position of the moving object is selected from the group consisting of the x, y, and z coordinates of the moving object.

Further in accordance with a preferred embodiment of the present invention at least one component of the acceleration of the moving object comprises at least two components.

Still further in accordance with a preferred embodiment of the present invention at least two components of the acceleration of the moving object comprises three components.

Additionally in accordance with a preferred embodiment of the present invention at least one component of the acceleration of the moving object is selected from the group consisting of the $a_x$, $a_y$, and $a_z$ acceleration components of the moving object.

Still further in accordance with a preferred embodiment of the present invention calculating the second estimate of at least one component of the position and orientation of the moving object comprises employing at least one estimate of an acceleration value's components in order to compute an estimate of the at least one component of the moving object's location, and employing the at least one independently measured component of the acceleration of the moving object as the at least one estimated acceleration value's components, rather then deriving the at least one estimated acceleration value's components from the electromagnetic field information.

Additionally in accordance with a preferred embodiment of the present invention employing the at least one independently measured component of the acceleration of the moving object as the at least one estimated acceleration value's components improves the accuracy of the estimate of the at least one component of the position and orientation of the moving object.

Also in accordance with a preferred embodiment of the present invention the electromagnetic field receiver comprises a single axis electromagnetic field receiver, with the accelerometer is attached thereto, such that employing the at least one independently measured component of the acceleration of the moving object as the at least one estimated acceleration value's components provides information about the axial rotation of the moving object.

There is further provided in accordance with a preferred embodiment of the present invention a system for monitoring of the position of at least one portion of an object, the system including at least one positioning sensors arranged to be fixed to at least one corresponding portion of the object whose positions it is sought to monitor, each of the at least one positioning sensors including an acceleration detector having at least one active direction lying along the at least one active axes of the direction of movement, and at least one digital signal processors for storing at least one characteristic of the acceleration component.

It is a particular feature of a preferred embodiment of the present invention that at least one acceleration detecting component is used to detect the acceleration of at least one acceleration component of at least one sensor for at least one portion of the time.

Still further in accordance with a preferred embodiment of the present invention the acceleration detector has at least a single (detection) active axis and is operative to receive the component of the acceleration measurements along the single (detection) active axis.

There is also provided in accordance with another preferred embodiment of the present invention a system for monitoring the position of at least one portions of an object in three-dimensional space having three axes, the system including a plurality of electromagnetic transmitters each having a center and each operative to transmit alternating electromagnetic fields within a three-dimensional space, a transmitter orientation maintainer operative to maintain at least three of the transmitters in orientations such that at least a component of the electromagnetic field of at least one of the transmitters falls within each of the 3 axes of the 3-dimensional space, and wherein less than all of the centers of the transmitters coincide, at least one positioning sensors arranged to be fixed to at least one corresponding portions of the object whose positions it is sought to monitor, each of the at least one positioning sensors comprising an electromagnetic field receiver receiving the alternating electromagnetic fields from the plurality of transmitters, and at least one accelerometer detector with at least one active direction, and at least one digital signal processor for storing at least one characteristic of the electromagnetic fields as transmitted by the plurality of transmitters and comparing the at least one characteristic to at least one characteristic of the electromagnetic fields as received by at least a corresponding one of the at least one positioning sensors and, at least one component of the acceleration of the movement of the sensor in the direction of at least one axis and, accordingly, determining at least one position characteristic of at least one object portion.

Still further in accordance with a preferred embodiment of the present invention the at least one acceleration detector is provided integrally with a corresponding one of the at least one positioning sensors.

There is also provided in accordance with yet another preferred embodiment of the present invention a system for monitoring the position of at least one portions of an object in three-dimensional space having three axes, the system including a plurality of electromagnetic transmitters each having an active axial direction and each operative to transmit alternating electromagnetic fields within a three-dimensional space, a transmitter orientation maintainer operative to maintain at least three of the transmitters in orientations such that at least a component of the electromagnetic field of at least one of the transmitters falls within each of the 3 axes of the 3-dimensional space, and wherein less than all of the transmitters' active axial directions are mutually orthogonal, at least one positioning sensors arranged to be fixed to at least one corresponding portions of the object whose positions it is sought to monitor, each of the at least one positioning sensors comprising an electromagnetic field receiver receiving the alternating electromagnetic fields from the plurality of transmitters and, at least one component of the acceleration of the movement of the sensor in the direction of at least one axis and at least one digital signal processor for storing at least one characteristic of the electromagnetic fields as transmitted by the plurality of transmitters and comparing the at least one characteristic to at least one characteristic of the electromagnetic fields and at least one component of the acceleration measured by the accelerometer as received by at least a corresponding one of the at least one positioning sensors and, accordingly, determining at least one position characteristic of at least one object portion.

Still additionally in accordance with a preferred embodiment of the present invention at least one of the at least one digital signal processors, illustrated in FIG. 9, is operative to simultaneously process acceleration characteristics arriving from at least one of the plurality of the accelerometer components.

There is also provided in accordance with a preferred embodiment of the present invention a method for monitoring of the position of at least one portion of an object, the method includes affixing at least one positioning sensor to at least one corresponding portion of the object whose positions it is sought to monitor, the sensors being operative to receive alternating electromagnetic fields existing within a three dimensional space containing the object, comparing at least one characteristic of the electromagnetic fields as transmitted to at least one characteristic of the electromagnetic fields as received by the sensors and at least one component of the acceleration of the sensor during it movements in at least one spatial axis.

There is also provided in accordance with a preferred embodiment of the present invention a method for improving the accuracy of the position of at least one portions of an object, the method including affixing at least one positioning sensors arranged to be fixed to at least one corresponding portions of the object whose positions it is sought to monitor, each of the at least one positioning sensors comprising at least one acceleration detector having at least one active axes and operative to receive at least one component, lying along the at least one active axes respectively, of the direction of movement and, accordingly, use the data to increase the degree of accuracy of the positioning and orientation of at least on sensor attached to at least one portions of an object.

There is also provided in accordance with a preferred embodiment of the present invention a method for comparing the position and orientation results obtained with the electromagnetic fields detection components and the combined information of both the electromagnetic field detector and the acceleration detector of at least one sensor, and indication of inconsistency between the two results to monitor possible electromagnetic disturbances in the sensor's environment.

There is thus further provided in accordance with yet another preferred embodiment of the present invention position and orientation tracking apparatus operative to track the position and orientation of a moving object based on electromagnetic flux measurements taken in the vicinity of the moving object and possibly acceleration measurements, the position and orientation tracking apparatus including a non-linear Kalman filter-based tracker operative to receive electromagnetic flux measurements performed in the vicinity of the moving object and possibly acceleration measurements thereof, to operate a non-linear Kalman-type filter on the measurements, thereby to generate information regarding the position and orientation of the moving object, and a position and orientation indicator operative to provide an output indication of the information regarding the position and orientation of the moving object.

The acceleration measures can be performed by 1-, 2- or 3-axis accelerometers, or by two 2-axis, or combinations thereof. The accelerometers can be laid on-center of the electromagnetic sensor or off-center, or in combinations thereof.

Further in accordance with a preferred embodiment of the present invention the position and orientation coordinates include 3 spatial coordinates and 3 orientation coordinates. The spin angle $\psi$ is determined by the EKF by fusing the measurement data coming from the magnetic fluxes and the accelerometers.

Further in accordance with a preferred embodiment of the present invention the acceleration measurements are performed in the moving frame of the sensor, and when fused with the electromagnetic measurements by the EKF it enables the extraction of the full orientation.

Further in accordance with a preferred embodiment of the present invention the acceleration measurements increase the precision of the position and orientation measurements by fusing them with the electromagnetic measurements by the EKF.

Further in accordance with a preferred embodiment of the present invention the acceleration measurements eliminate or reduce the effect of passive magnetic scattering field, which otherwise degrade the performance of the system considerably.

BRIEF DESCRIPTION OF THE DRAWINGS AND APPENDICES

The present invention will be understood and appreciated more fully from the following detailed description, taken in conjunction with the drawings and appendices in which.

Figure 1:
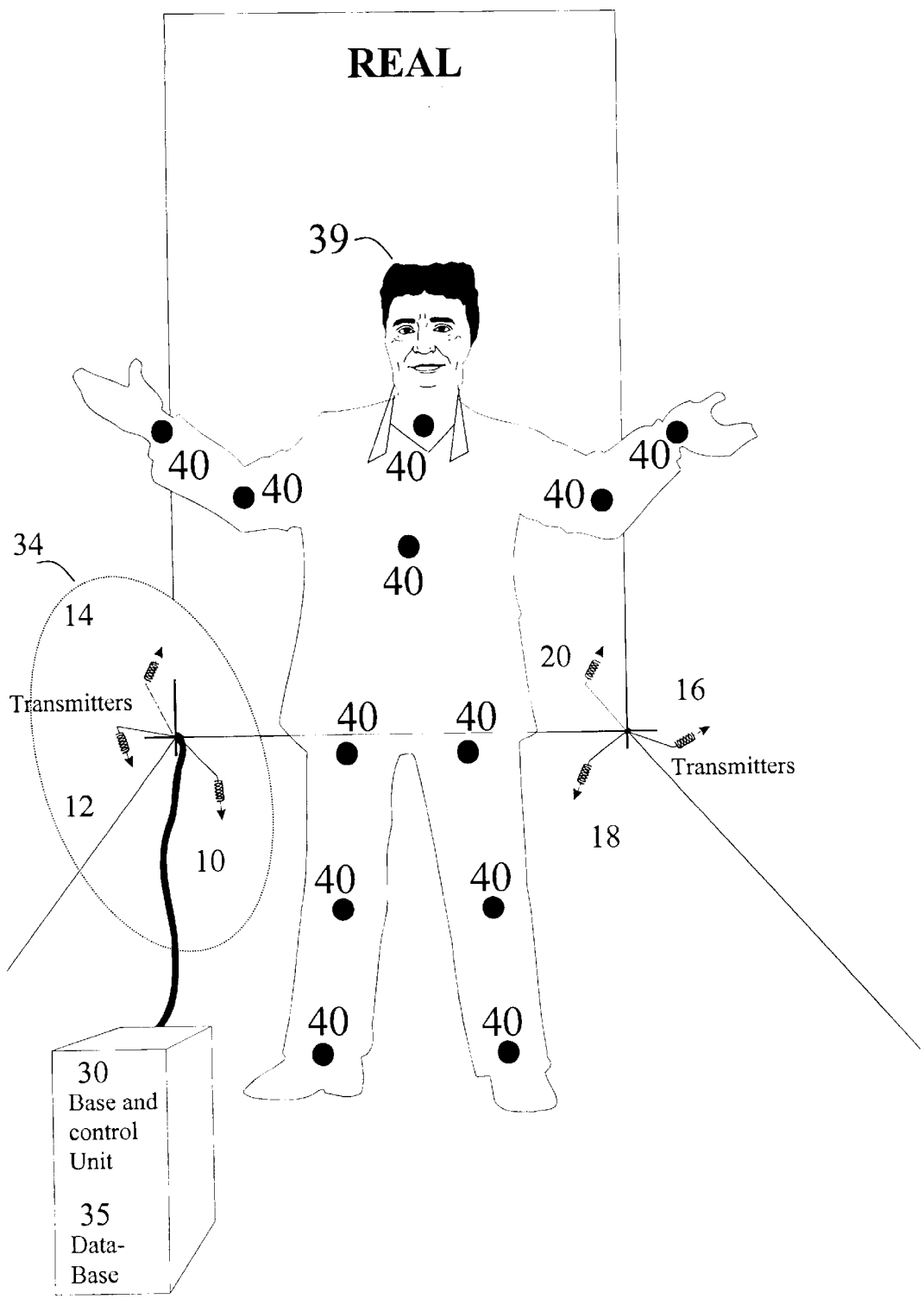
FIG. 1 is a simplified pictorial illustration of a positioning system constructed and operative in accordance with a preferred embodiment of the present invention which outputs the position of an object as a whole or parts thereof, such as, in the illustrated embodiment, body parts of a human user.

Appendix I is a computer listing of a software implementation of a preferred embodiment of the present invention, written in Matlab™; and Appendix II is an example of a suitable input file for Appendix I.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The term "spatial position" is employed herein to refer to the location of a detector or other object within a three-dimensional space which may, for example, be expressed in Cartesian coordinates (x, y, z) or alternatively may be expressed in any other suitable coordinate system such as a spherical system.

The term "angular position" or "orientation" is employed herein to refer to the orientation of the detector or other object relative to the fixed reference frame of the three-dimensional space. It may, for example, be expressed as Euler z,y,z angles (θ, φ, y). The orientation may, of course, also be expressed in other suitable coordinates such as yaw, pitch and roll.

The term "location" is employed herein to refer to position and/or the orientation of the detector or other object relative to the fixed reference frame of the three-dimensional space.

The term "electromagnetic field transmitter" or "transmitter" is employed herein to refer to a transmitter transmitting electromagnetic or magnetic waves preferably at a frequency of 1–100 kHz. Preferably, the transmission are continuous rather than pulse transmissions.

The term "RF" is employed herein to refer to radio frequencies as commonly used in the art for common data-communication and control purposes.

The term "magnetic field" is intended to include magnetic fields as well as electromagnetic fields.

The term "electromagnetic field" is intended to include magnetic fields as well as electromagnetic fields.

The term "sensing coil" is intended to include an electronic or other components that is capable of sensing electromagnetic fields as well as magnetic fields and magnetic flux.

The term "detector" refers to a device operative to covert the magnetic flux or fields that crosses its area or any other properties of the electromagnetic field, into electric voltage signals and may include also a plurality of acceleration detecting components each operative to transform the acceleration information into electric voltage signals.

The terms "state vector" and "state matrix" are employed herein to refer to all time-dependent variables that are relevant to describe the dynamic evolution of the system including its position, orientation, spatial and angular velocity and spatial and angular acceleration. One possible choice is: $[x, y, z, \phi, \theta, \psi, \dot{x}, \dot{y}, \dot{z}, \dot{\phi}, \dot{\theta}, \dot{\psi}, \ddot{x}, \ddot{y}, \ddot{z}, \ddot{\phi}, \ddot{\theta}, \ddot{\psi}]$ as may be seen in the following.

The term "moving object" is intended to refer to an object of interest which is moving at least a part of the time or which has at least one part which is moving at least a part of the time. Alternatively, the "moving object" may not itself be in motion but its position relative to another object which is sometimes in motion, is of interest. In summary, the term "moving object" is intended to refer to any object whose absolute or relative location is of interest to a user.

Reference is now made to FIG. 1, which is a simplified pictorial illustration of a positioning system constructed and operative in accordance with a preferred embodiment of the present invention. The system preferably outputs the spatial and/or angular position of an object, such as a human user, as a whole or of parts thereof, such as, in the illustrated embodiment, body parts of the human user. The positioning system of FIG. 1 comprises a plurality of (N) electromagnetic field transmitters, for example, 10, 12, 14, 16, 18 and 20, each of which preferably comprises a mutually non-parallel antenna coil. Each transmitter defines an active axial direction, e.g. the axis of the coil if the transmitter comprises a coil.

The plurality of (in the illustrated embodiment) antenna coils preferably each transmit at a different frequency, $f_1, \ldots, f_N$ respectively, and each produce a electromagnetic field. The coils are preferably arranged such that, for each of the three orthogonal axes, there exists at least two antenna coils whose electromagnetic fields each have a component substantially along that orthogonal axis. For example, the coils may be mutually arranged such that there are two triplets of antenna coils and each triplet of antenna coils includes, for each of the three orthogonal axes, at least one antenna coil whose electromagnetic field has a component along that orthogonal axis.

In the illustrated embodiment, for simplicity, the number of sensing coils comprising sensor 40 is assumed to be 1, however, it is appreciated that any suitable number M of sensing coils may be employed, particularly for redundancy purposes.

It is a particular feature of a preferred embodiment of the present invention that the antenna coils need not be exactly mutually orthogonal and need not be arranged such that the centers of the antenna coils coincide. This is advantageous because it allows greater flexibility in positioning the antenna coils in the range in which the object is known to move. It also allows the antenna coils to be well distributed such that the object can be accurately and rapidly positioned in all portions of the range. Moreover, this tends to reduce production costs because it is not necessary to precision-position the coils in a mutually orthogonal configuration.

Preferably, each of the plurality of the electromagnetic field transmitters as illustrated for example by 10, 12, 14, 16, 18 and 20 comprises an oscillator which provides a sinusoidal signal output. Preferably, the signal outputs from the signal sources are in the range of 1–100 kHz, and preferably in the range of 9–14 kHz.

Also shown are base and control unit 30, and database 35 which are used to store temporary data of the current location of each of the plurality of the sensors as well as all predefined and time-dependent information of the field transmitters. The system control unit is also used to control the amplitudes and phases of the N electromagnetic transmitters of the system and to control the various communication levels between said transmitters and the plurality of the sensors. One of the primary uses of the control unit is also to transfer the location data collected from each of the plurality of the sensors, via a wire line or a wireless data communication procedure that may optionally display or be further processed subject to an external application request.

Figure 2:
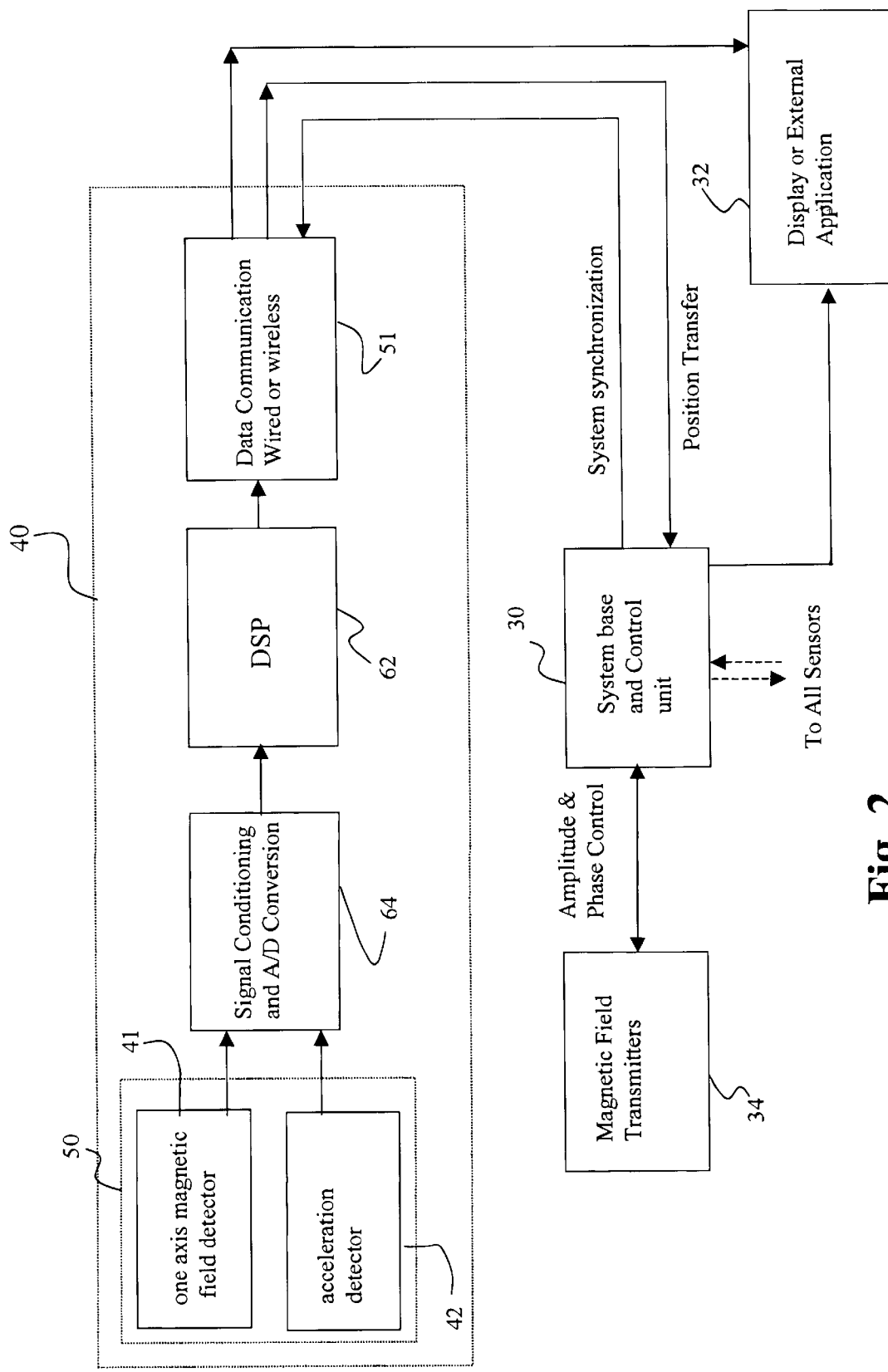
FIG. 2 is a simplified functional block diagram illustration of the apparatus of FIG. 1.

Reference is now made to FIG. 2 which is a simplified functional block diagram illustration of the apparatus of FIG. 1, constructed and operative in accordance with a preferred embodiment of the present invention. Probe sensor 40 typically comprises a detector 50, which typically comprises a multi-axial acceleration detector and at least one-axis antenna coil, and may alternatively comprise any other suitable type of one-axis electromagnetic field detector, such as a Hall-effect detector or a solid state component e.g. a magneto-resistive detector or a magneto-diode or a magneto-transistor. In the illustrated embodiment, detector 50 comprises electromagnetic field detector 41, and at least one linear multi-axial acceleration detector 42 which detects the actual acceleration components in the direction perpendicular to its prime axis.

Detector 50 is connected to a digital signal processor 62 via signal conditioning and A/D conversion unit 61. The analog output of the electromagnetic signal detector is a voltage signal proportional to the superposition of the N electromagnetic field transmitters at the coordinates $x^i, y^i, z^i, \phi^i, \theta^i$, and $y^i$ where the index i denotes the position of the electromagnetic source i. The output of the acceleration detecting components are voltage signals which are functions of the actual acceleration components in the direction perpendicular to its prime axis.

The analog signals of both electromagnetic field detectors and the acceleration components of sensor 40 are typically digitized and are introduced as an input data to an integrated digital signal processor 62 which preferably computes the position and orientation coordinates of the sensor. The output from digital signal processor 62 is transferred to data communication unit 51 and then to system control unit 30. The refresh rate of the output data is typically of the order of few times per second to a few hundred times per second.

In accordance with a preferred embodiment of the present invention, a positioning sensor 41 is provided for sensing the spatial and/or angular position of a magnetic field detector included therein. The positioning sensor also, of course, senses the spatial and/or angular position of any objects which are fixed with respect to the magnetic field detector 41. The spatial and/or angular position is typically computed relative to a predetermined reference coordinate system.

It is a particular feature of a preferred embodiment of the present invention that positioning sensor 40 employs a single magnetic detector 41 and a bi-axial accelerometer, 42, which output to an on-board digital signal processor circuit (62 in FIG. 6), which, in turn, provides an output indication of the spatial and angular positions of detector 41, each in three dimensions.

The detector 50 may comprise a multi-axis magnetic sensor 41 and multi-axis accelerometer 42. Alternatively, the detector 41 may comprise a one-axis antenna coil, as illustrated in FIG. 2, or may alternatively comprise any other suitable type of one-axis electromagnetic field detectors, such as a Hall-effect detector or a solid state component, e.g., a magneto-resistive detector or a magneto-diode or a magneto-transistor or any combination thereof.

The sensor 40 is attached to a moving object or an individual 39, such as a person, whereas the electromagnetic field transmitters are stationary. If the moving object or person 39 is not rigid, there may be a plurality of sensors 40 and each of these is attached to a corresponding one of a plurality of portions of the moving object or individual, as shown in FIG. 1. This allows monitoring of the spatial and angular positions of these individual portions.

The electromagnetic field transmitters may be fairly close together, e.g., even less than one meter apart. However, most advantageously, there is an optimal distance between the individual transmitters such that an improved performance of the system is achieved, depending on the application. The electromagnetic transmitters may be positioned horizontally, vertically or in a mixed fashion. It can be laid on the floor, hanged from the ceiling or appended to a wall.

A particular feature of a preferred embodiment of the present invention is that localization is performed despite the fact that the dynamic range of the amplitudes $C^1, \ldots, C^N$ of the plurality of the electromagnetic signals generated respectively by the transmitter coils as illustrated by 10, 12, 14, 16, 18 and 20 is typically very large. More generally, there are N amplitudes $C^1, \ldots, C^N$, however, for simplicity, the specification sometimes follows the example wherein N=6.

The position data may be transferred to the system control unit via a wire line or a wireless data communication procedure that may optionally display or further process the positioning information of sensor 40. The system control unit also controls the amplitudes and phases of the N electromagnetic transmitters in the system.

In accordance with a preferred embodiment of the present invention, the system control unit 30 in FIG. 2, may be composed of a separate unit block 32 to collect spatial position data from all sensors 40 to be displayed or to be used by an external application unit. Alternatively, the positioning information from one or all sensors may directly be received by an external application unit.

Figure 3:
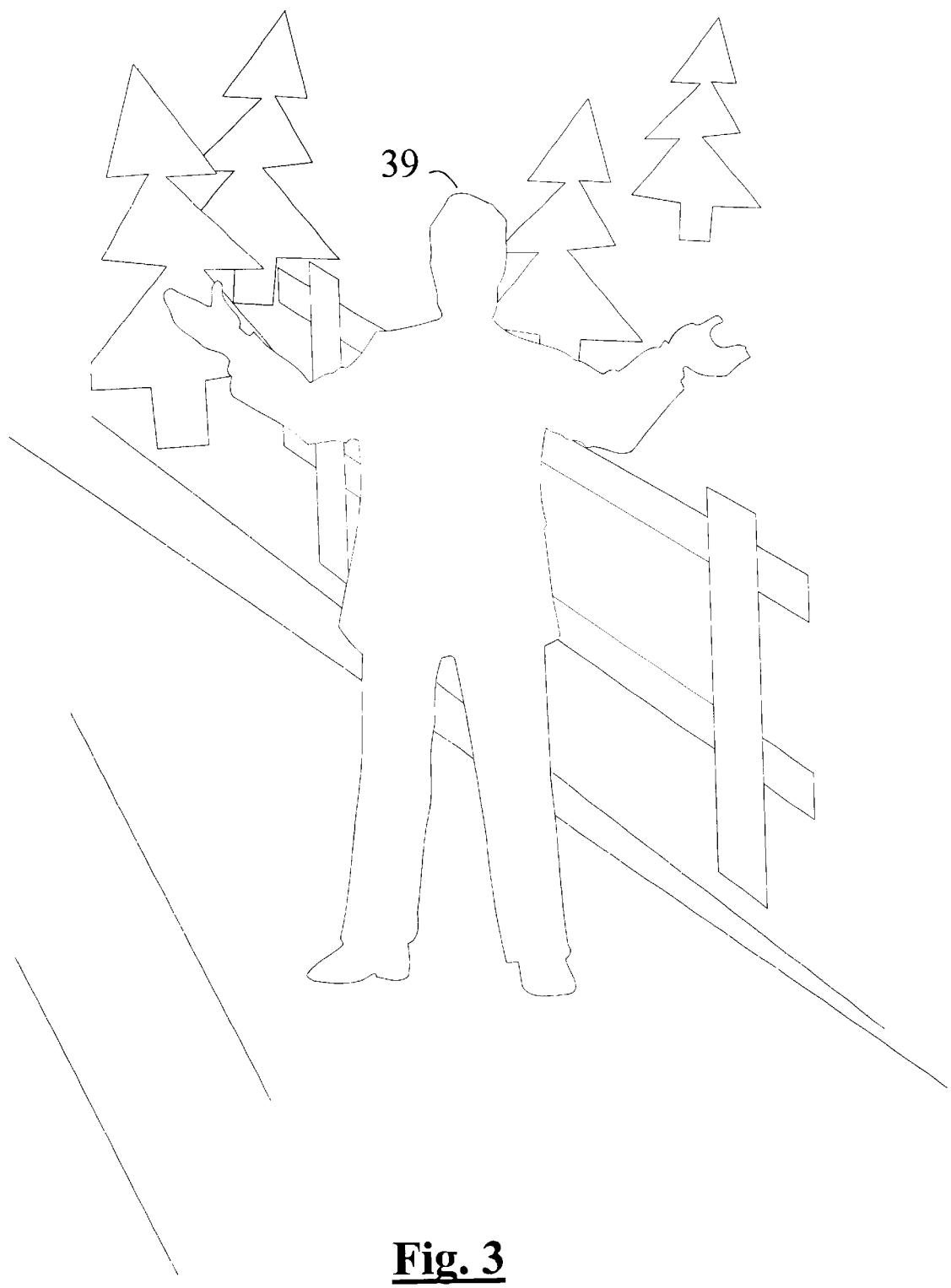
FIG. 3 is a virtual reality application of the system of FIG. 1 in which a simulation system receives the position outputs generated by the system of FIG. 1 and generates a display image including a computer-generated scene and a figure having body part motion which mimics the body part motion of the human user of FIG. 1 as detected by the positioning system of FIG. 1.

Reference is now made to FIG. 3 which is a display image generated by a virtual reality application of the system of FIG. 1. A virtual reality system receives the position. outputs generated by the system of FIG. 1 and generates the display image of FIG. 3 which includes a computer-generated scene (fence, path and trees in the illustrated embodiment) and a figure having body part motion which mimics the body part motion of the human user of FIG. 1 as detected by the positioning system of FIG. 1.

Figure 4:
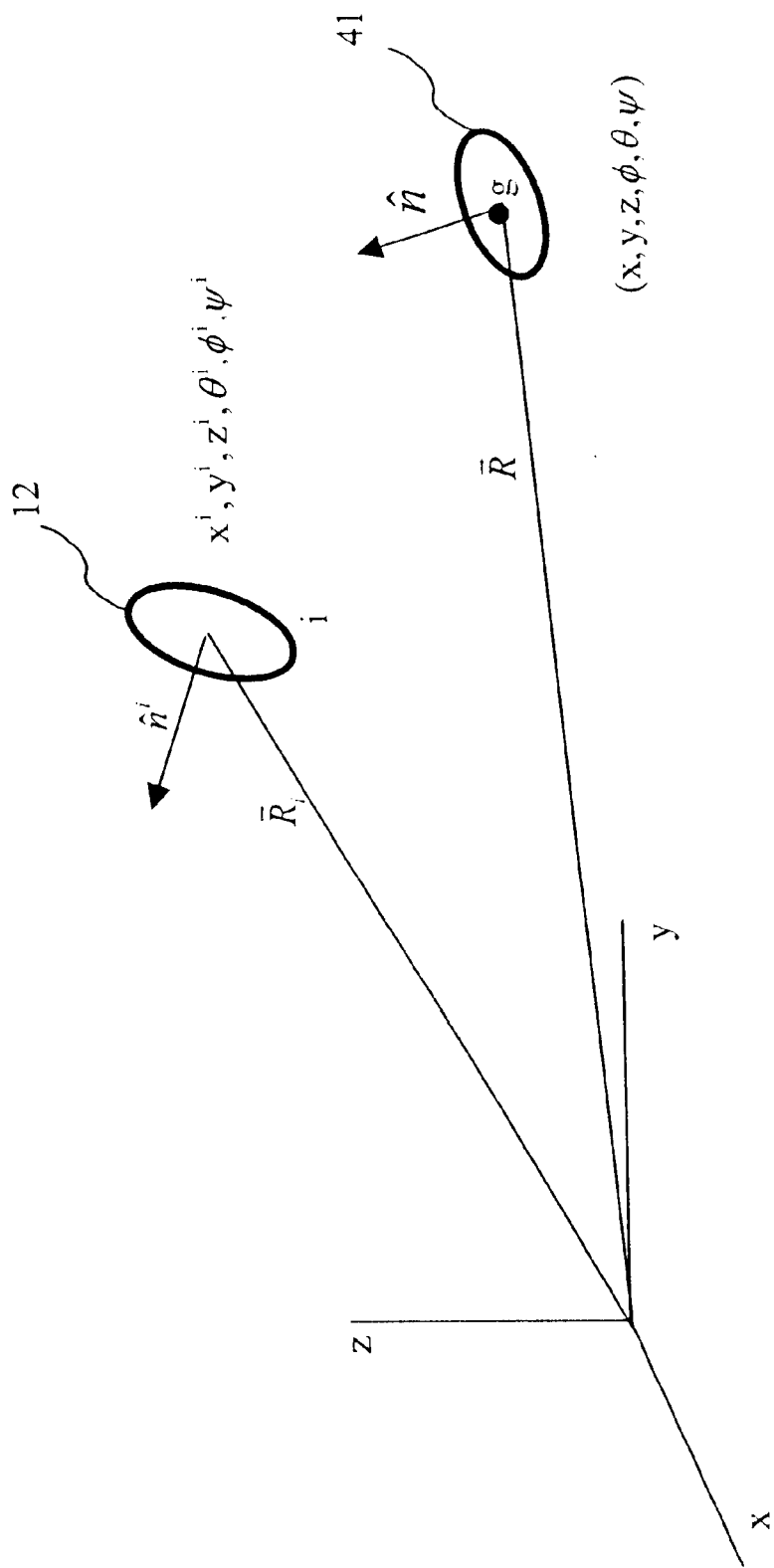
FIG. 4 is a detailed diagrammatic illustration of an Electromagnetic field transmitter and a positioning sensor provided in accordance with a preferred embodiment of the present invention.

Reference is now made to FIG. 4 which is a diagrammatic illustration of an electromagnetic field transmitter and a positioning sensor provided in accordance with a preferred embodiment of the present invention. Shown is one of the N electromagnetic field transmitters of FIG. 1, such as electromagnetic field transmitter 12, and one of the detection coil 41 of the positioning sensors 40.

The spatial and angular position of the i'th electromagnetic field transmitter (i=1, ..., N) is denoted as ($x^i$, $y^i$, $z^i$, $\phi^i$, $\theta^i$ and $y^i$) and the spatial and angular position of an individual positioning sensor 40 is denoted as (x, y, z, θ, φ and y). The electromagnetic field at point g at the center of the electromagnetic sensor 41 due to a current flowing in a thin conducting circular loop representing the source i is well known in the literature and may be expressed in terms of elliptic integrals of the first and second kind as described, for instance, in J. D. Jackson, *Classical Electrodynamics*, Wiley, Second Ed., 1975, Chapter 5, p. 178. Since working with such integrals is cumbersome, it is alternatively possible to use approximate expressions as described thererein.

When the distance between origin and the i'th source loop center ($\vec{r}^i$) to the point of observation ($\vec{r}$) is large in comparison with the loop radius $a^i$, (where $a^i << |\vec{r}-\vec{r}^i|$), the exact integral can be expanded into a power series $$\frac{a^i}{|\vec{r}-\vec{r}^i|}$$

which is known to be small. The magnetic field may thus be written as:

$$\vec{B}^i = \vec{B}_I^i + \vec{B}_{II}^i + \ldots \tag{1}$$

The first and the sum of the first and the second terms of the power series is given by Equations 2 and 3 respectively:

$$\vec{B}_I^i = \frac{\beta^i}{|\vec{r}-\vec{r}^i|^3}\left[\frac{3\cdot(\vec{r}-\vec{r}^i)\cdot[(\vec{r}-\vec{r}^i)\cdot\hat{n}^i]}{|\vec{r}-\vec{r}^i|^2} - \hat{n}^i\right], i=1,2,\ldots,N \tag{2}$$

where $\hat{n}^i$ is the unit vector representing the normal to the i'th electromagnetic field transmitter coil plane, if a one-axis antenna coil is used as the transmitter, and:

$$\vec{B}_I^i + \vec{B}_{II}^i = \frac{\beta^i}{|\vec{r}-\vec{r}^i|^3}\left[\frac{3\cdot(\vec{r}-\vec{r}^i)\cdot[(\vec{r}-\vec{r}^i)\cdot\hat{n}^i]}{|\vec{r}-\vec{r}^i|^2}(1-\delta) - \hat{n}^i(1-\gamma)\right], \tag{3}$$

$$i=1,2,\ldots,N$$

where:

$$|\vec{r} - \vec{r}^i| = \sqrt{(x-x^i)^2 + (y-y^i)^2 + (z-z^i)^2} \quad \text{and:} \tag{4}$$

$$\beta^i = \frac{\mu A^i \cdot T^i \cdot I^i(t)}{4\pi} \tag{5}$$

$$\delta = \frac{5}{3}\left(\frac{a^i}{|\vec{r} - \vec{r}^i|}\right)^2 \left[-3 + 7[(\vec{r} - \vec{r}^i) \cdot \hat{n}^i]^2\right] \tag{6}$$

$$\gamma = \frac{9}{8}\left(\frac{a^i}{|\vec{r} - \vec{r}^i|}\right)^2 \left[-1 + 5[(\vec{r} - \vec{r}^i) \cdot \hat{n}^i]^2\right] \tag{7}$$

where:

$A^i$=the i'th source coil area.

$T^i$=the number of turns in the i'th source coil;

$I^i$=the current in the i'th source coil where all the currents in the system are assumed harmonically time dependent The magnetic permeability ($\mu$) in the air is given by $\mu=\mu_o\mu_r$, where $\mu_r$ is the magnetic permeability of the transmitter core and $\mu_0$ is the vacuum permeability.

The accuracy of the first term of the series $\overline{B}_I^i$ is improved as the quotient of $$\frac{a^i}{|\vec{r} - \vec{r}^i|}$$

gets smaller because the inaccuracy is of the order of the square of the quotient of $$\frac{a^i}{|\vec{r} - \vec{r}^i|}.$$

For example, when the quotient is greater than 0.05, the expected error of the above approximation is of the order $10^{-4}$. However, the condition of $a^i << |\vec{r}-\vec{r}^i|$ is not always fulfilled, especially in cases where the transmitters are distributed throughout the entire volume of the object's range, in order to improve system performance. In these cases, the second term in Equation 1 becomes significant.

When detector 41 comprises a coil, then assuming that the detector coil's radius is very small relative to the transmitter coil, the electromotive force $\epsilon^i$ induced on the coil 41 by the transmitter coil i located at coordinates ($x^i$, $y^i$, $z^i$, $\phi^i$, $\theta^i$ and $\psi^i$) is given by:

$$\varepsilon^i = \frac{d}{dt}[\overline{B}^i \cdot \hat{n}] \cdot A^d = \frac{x^i}{|\vec{r} - \vec{r}^i|^3}\left[\frac{3}{|\vec{r} - \vec{r}^i|^2}(D_1^i \cdot D_2^i) - D_3^i\right], i = 1, 2, \ldots, N \tag{8}$$

The second equality is the "dipole approximation" where we neglected here higher orders of $$\frac{a^i}{|\vec{r} - \vec{r}^i|} \quad \text{and:} \tag{9}$$

$$x^i = \frac{dI^i}{dt} \cdot A^d \cdot T^d$$

Preferably the transmitter coil is driven by a time harmonic dependent current, and thus:

$$\chi^i = \omega^i \cdot A^d \cdot T^d \tag{10}$$

where $$\omega^i = 2\pi f^i \tag{11}$$

where $\omega^i$ is the angular frequency of the current in source i and, $A^d$=is the detector's coil area.

$T^d$=is the number of turns in the detector coil and, $$D_1^i = \sin\theta^i \cos\phi^i(x-x^i) + \sin\theta^i \sin\phi^i(y-y^i) + \cos\theta^i(z-z^i) \tag{12}$$

$$D_2^i = \sin\theta \cos\phi(x-x^i) + \sin\theta \sin\phi(y-y^i) + \cos\theta(z-z^i) \tag{13}$$

$$D_3^i = \sin\theta^i \cos\phi^i \sin\theta \cos\phi + \sin\theta^i \sin\phi^i \sin\theta \sin\phi + \cos\theta^i \cos\theta \tag{14}$$

The voltage induced by the i'th source, at point Y(t) (57) in the sensor circuit (40) shown in FIG. 2, is given as follows:

$$V^i = C^i \lambda^i \tag{15}$$

where:

$$C^i = \frac{1}{|\vec{r} - \vec{r}^i|^3}\left[\frac{3}{|\vec{r} - \vec{r}^i|^2}(D_1^i \cdot D_2^i) - D_3^i\right], i = 1, 2, \ldots, N \quad \text{and:} \tag{16}$$

$$\lambda^i = \frac{\mu_0 A^i \cdot T^i \cdot I^i \cdot x^i \cdot \Omega(\omega^i)}{4} \tag{17}$$

where $\Omega$ is the transfer, complex in general, function of the coil and its front-end electric circuit up to the point (57) referred as Y(t) in FIG. 2.

The transformation between the Cartesian coordinate system to the polar coordinate system is given by the following set of equations;

$$\begin{cases} \cos\alpha = \sin\theta\cos\phi \\ \cos\beta = \sin\theta\sin\phi \\ \cos\gamma = \cos\theta \end{cases} \tag{18}$$

In order to specify the position and orientation of the sensor there are preferably at least 6 sources positioned at 6 respective different locations in space such that the projection on the axes of the Cartesian coordinate system of 3 out of the N sources form an orthogonal set. The sources allow the 5 coordinates (x, y, z, $\phi$, $\theta$, $\psi$) of spatial and angular position to be derived.

In addition, there is preferably at least one dual-axis accelerometer whose axes reside in the plane of the detector's coil. Such an accelerometer provides data which, when fused together with the electromagnetic data by means of the EKF, provide the sixth degree of freedom (the spin angle, $\psi$). The extraction of $\psi$ is achieved by matching the estimated projections of the acceleration onto the coil's plane, which are obtained from the electromagnetic and the accelerometer measurements. In addition, the inclusion of the acceleration data may increase the overall precision of tracking, if the accelerometers are precise enough. This is due to the fact that, in general, redundant data of high-quality improves the overall performance of the Kalman filter. Another preferred feature of the above mentioned embodiment is the ability to cancel, at least to some degree, the effect of passive electromagnetic disturbances, specifically magnetic waves which are scattered from metallic object in the environment of operation of the system. Since the accelerometers are indifferent to such electromagnetic disturbances and can provide accurate tracking to short distances, the fusion of electromagnetic data with accelerations is helpful in canceling the effect of such magnetic disturbances.

Figure 5:
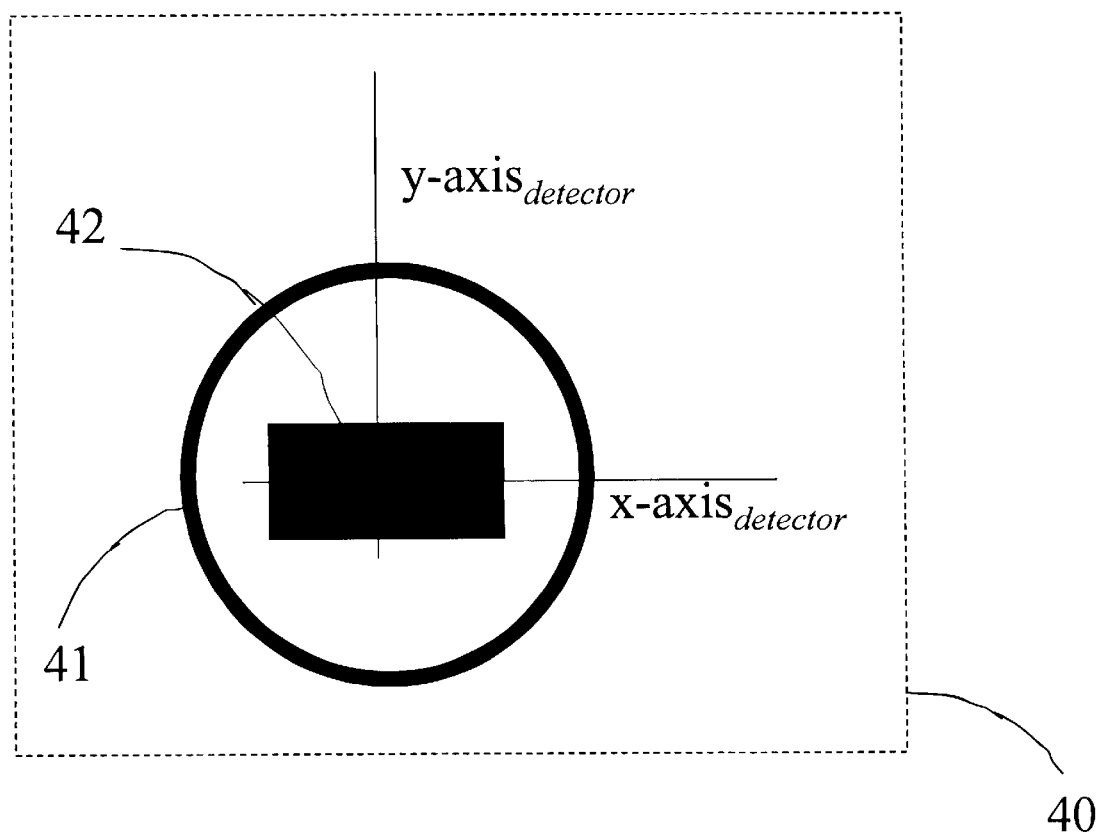
FIG. 5 is a detailed diagrammatic illustration of the sensor 40 of FIG. 1 including the electromagnetic sensing component and the accelerometer device.

Reference is now made to FIG. 5 which is a detailed diagrammatic illustration of sensor 40 of FIG. 1, including the electromagnetic sensing component 41 and the accelerometer device 42. The detector reference coordinate frame is also shown. It is appreciated that any multi-axial acceleration sensitive device may be utilized as accelerometer 42. It is further appreciated that the shape of the acceleration component need not be rectangular, and that the geometrical shape of the electromagnetic sensing device need not necessarily be circular.

Figure 6:
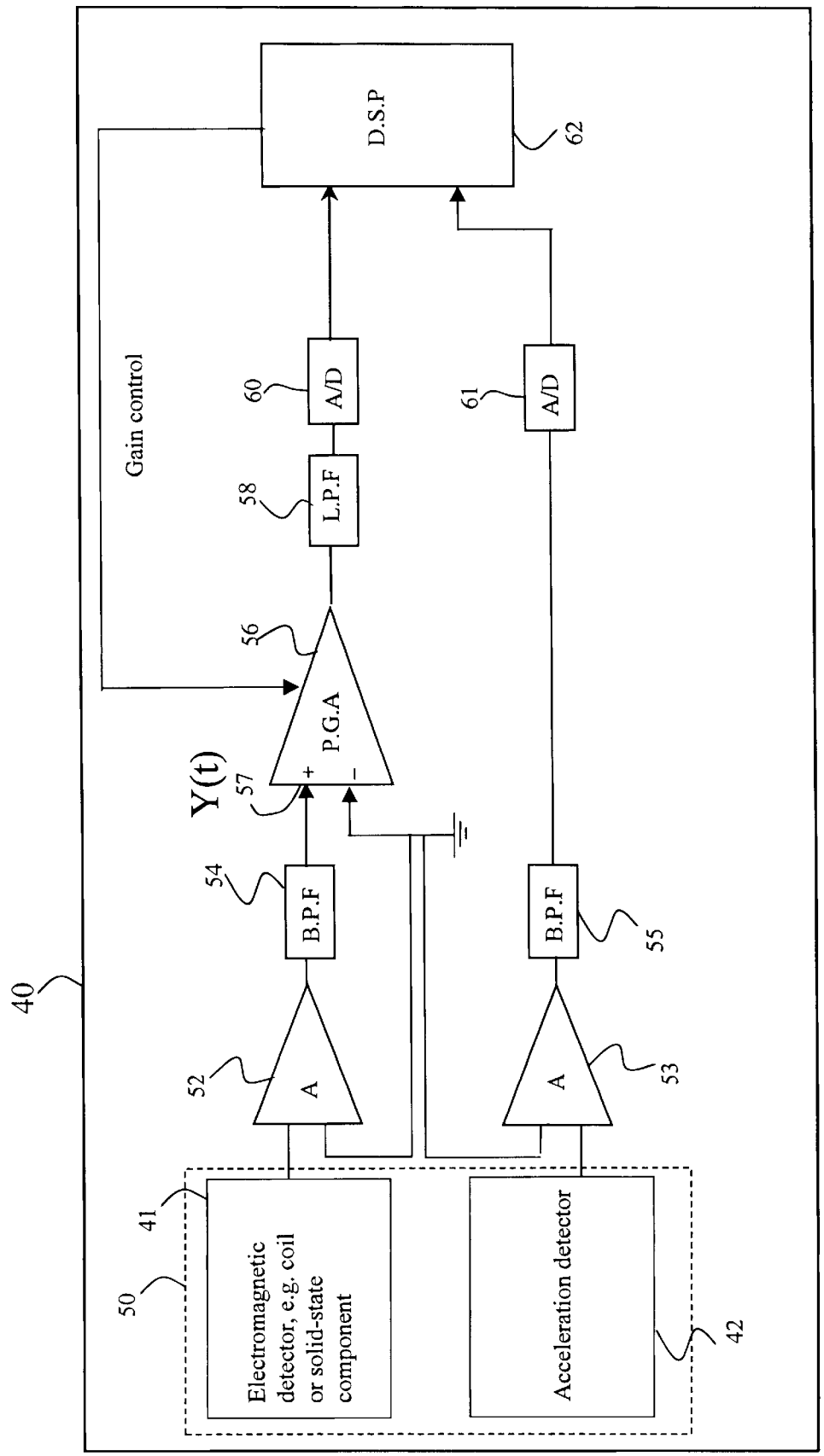
FIG. 6 is a simplified block diagram illustration of a preferred embodiment of an individual one of the positioning sensors of FIG. 1.

Reference is now made to FIG. 6, which is a simplified block diagram illustration of a preferred implementation of an individual one of the positioning sensors 40 of FIG. 1. As shown, the branch of the electromagnetic field detector 41 (such as, in the illustrated embodiment, a coil), outputs via an amplifier 52 and a band-pass filter (BPF) 54 to a programmable gain amplifier (PGA) 56 having programmable gain control. The analog signal is passed through a low pass filter (LPF) 58 which removes disturbances and noise above the working frequencies. This signal is digitized by an A/D converter 60 and introduced to DSP circuitry 62. Digital signal processing circuitry 62, whose operational modes will be described below in detail, provides a gain-control output to gain amplifier 56.

The output of the A/D converter 60 is supplied, to an envelope detector 114 within DSP 62, which is operative to determine the received envelope amplitudes (magnitude and sign) $C^1, \ldots, C^N$ of the plurality of the electromagnetic carrier signals received from the transmitter as illustrated by coils 10, 12, 14, 16, 18 and 20 respectively.

In a preferred embodiment, the acceleration detector 42 may comprise a surface-microelectronic device. Such a device, in its basic configuration, can be thought of as an acceleration to volts transducer. More advanced devices, such as ADXL202 from Analog Devices, are dual axis digital output ICs. These advanced devices integrate a signal conditioning circuit and a pulse width modulation (PWM) to the analog output of the accelerometer to produce a digital output.

Preferably, the output from the acceleration detector is introduced to a signal conditioning electronics, shown schematically as the second input branch to DSP 62. This input branch comprises amplifier 53, BPF 55 and A/D converter 61. The sampled digital signal is then introduced to the DSP 62 input.

The output of the envelope detector 114 is supplied, preferably together with accelerometer data 61, to the position determination unit 116. Unit 116 is operative, based on the signal amplitude values supplied by unit 114, to provide an output indication of the spatial and/or angular position of the magnetic field detector 41 in sensor 40.

Figure 7:
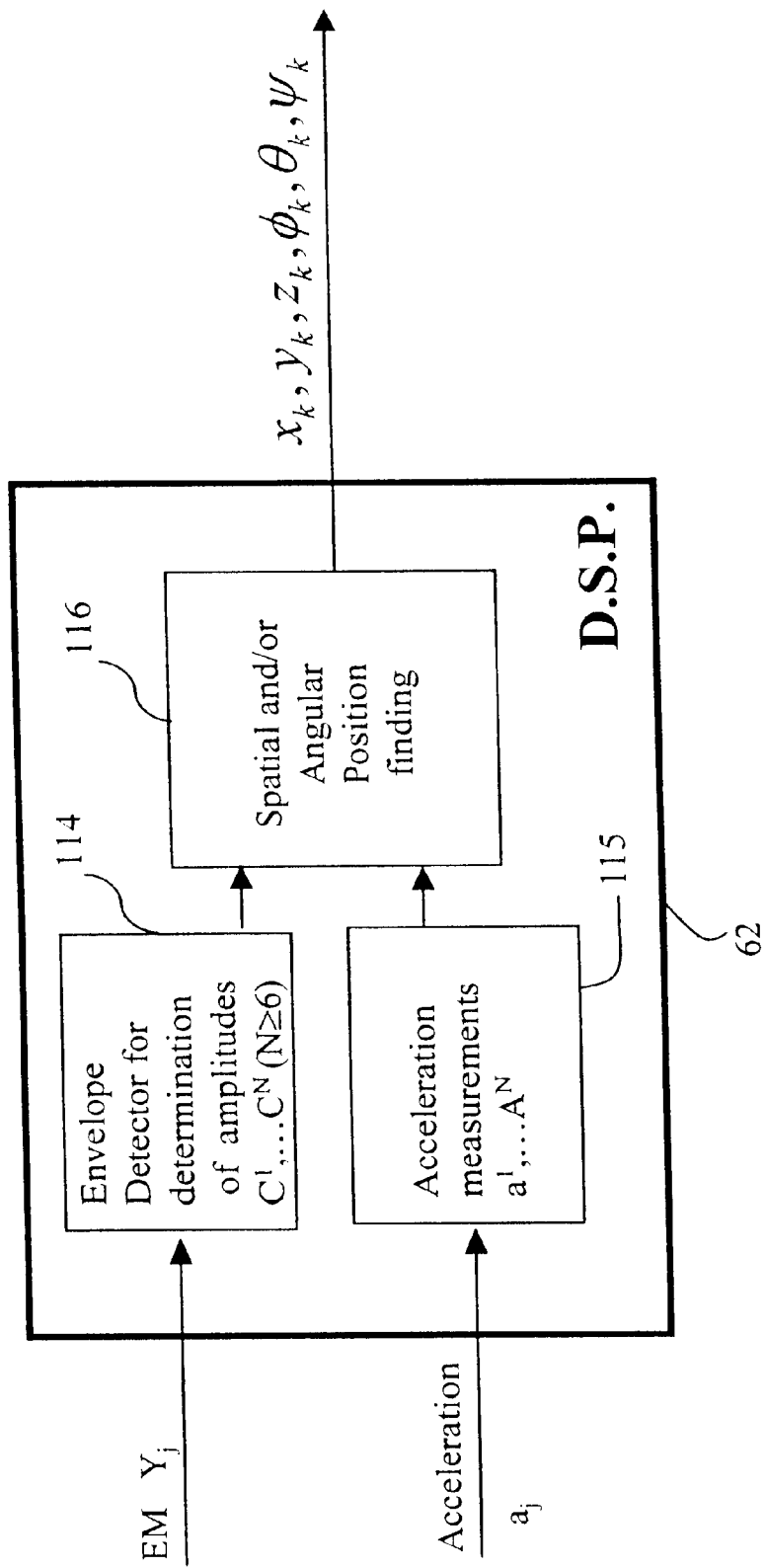
FIG. 7 is a simplified block diagram illustration of a preferred digital signal processing unit useful in the sensor of FIG. 6.

Reference is now made to FIG. 7 which is a simplified block diagram illustration of a preferred digital signal processing unit useful in the sensor of FIG. 6. The digital signal processor 62 typically comprises two modules: an envelope detector module 114 and a position determination unit 116.

The Envelope Detector 114 (hereafter referred as "ED"), is operative to determine the received envelope amplitudes (magnitude and sign) $C^1, \ldots, C^N$ of the N electromagnetic signals received from the N Electromagnetic field transmitters. The ED is typically comprised of N identical envelope detectors working in parallel. Each of the ED modules preferably comprises two sub-modules: a PLL, and a system synchronization unit, which is operative during the operation of the ED module to define the absolute sign of the signal amplitude. Alternatively, each ED module preferably comprises three sub-modules operating in parallel and another sub-module that is called when a system synchronization is needed. The three sub-modules are: a PLL, a non-coherent absolute value envelope-detector, and a sign detection unit. A fourth sub-module, system synchronization unit, may be employed to define the absolute sign of the signal amplitude.

The output of the envelope detector is supplied to the position determination unit which is operative, based on the signed amplitude values supplied by the envelope detector, to provide an output indication of the position of the electromagnetic field detector in the sensor.

The output of the A/D converter 60 is supplied to an envelope detector 114, which is operative to determine the received envelope amplitudes (magnitude and sign) $C^1, \ldots, C^N$ of the N electromagnetic signals received from the N electromagnetic field transmitters. ED 114 is described schematically in FIG. 8 and preferably comprises N identical envelope detectors (ED) possibly working in parallel. One of the ED's is described schematically in FIG. 9, where each of the ED modules comprises two sub-modules: a PLL 132, with reference to "Phase Locked Loops" to Roland E. Best et al., McGraw Hill (see above) and a system synchronization Unit 420, which is preferably employed during the operation of the ED module to define the absolute sign of the signal amplitude.

The output of the envelope detector 114 is supplied to the position determination unit 116 which is preferably operative, based on the signed amplitude values supplied by unit 114, to provide an output indication of the position of the electromagnetic field detector 50 in sensor 40. The position determination of module 116 is based on solving at least N analytic equations with N unknowns.

Figure 8:
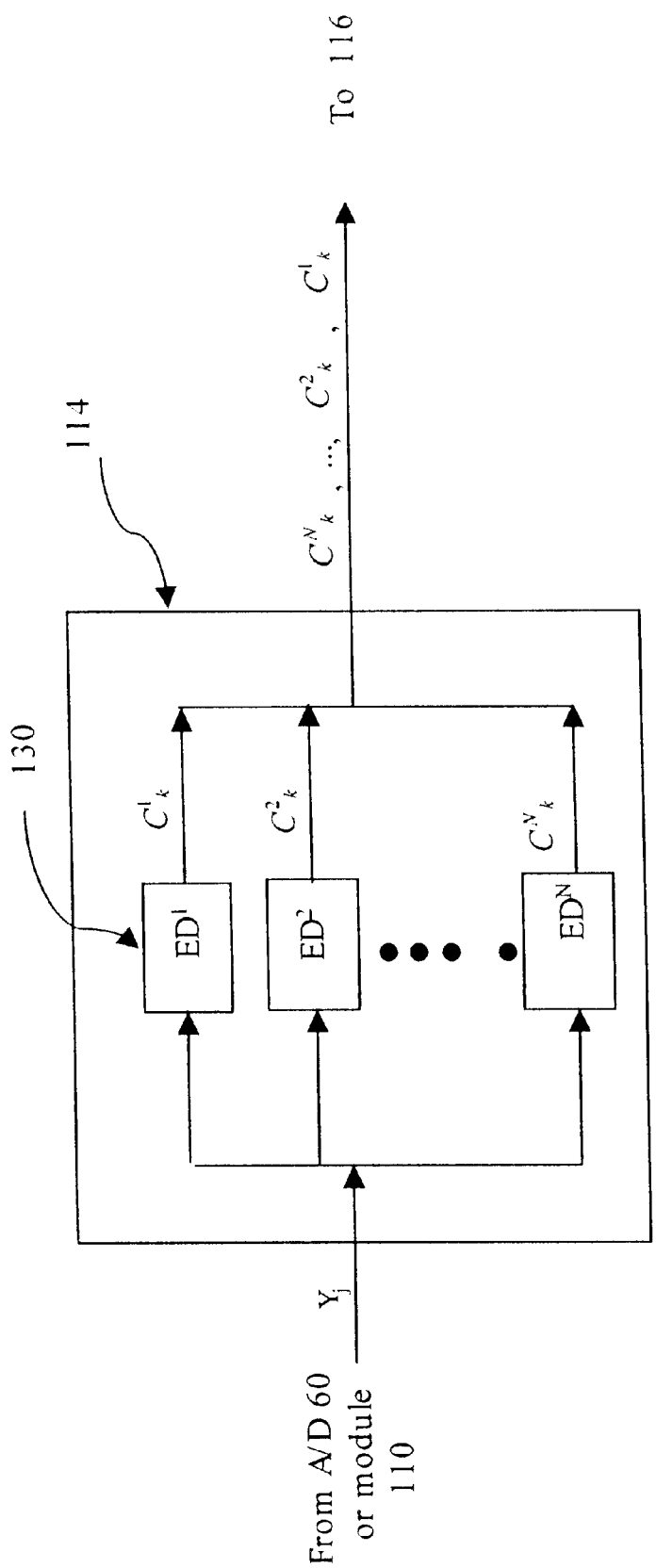
FIG. 8 is a simplified block diagram illustration of the envelope detector of FIG. 7, constructed and operative in accordance with a preferred embodiment of the present invention.

Reference is now made to FIG. 8 is a simplified block diagram illustration of the envelope detector 114 of FIG. 7, constructed and operative in accordance with a preferred embodiment of the present invention. As shown, envelope detector 114 preferably comprises N envelope detecting (ED) modules 130 (where N=6 in the illustrated embodiment). Each module determines the received envelope amplitude (magnitude and sign) $C^i(t_k)$ of one of the N magnetic carrier signals received, in the illustrated embodiment, from one of the N=6 transmitter coils 10, 12, 14, 16, 18 and 20 in the illustrated example.

Figure 9:
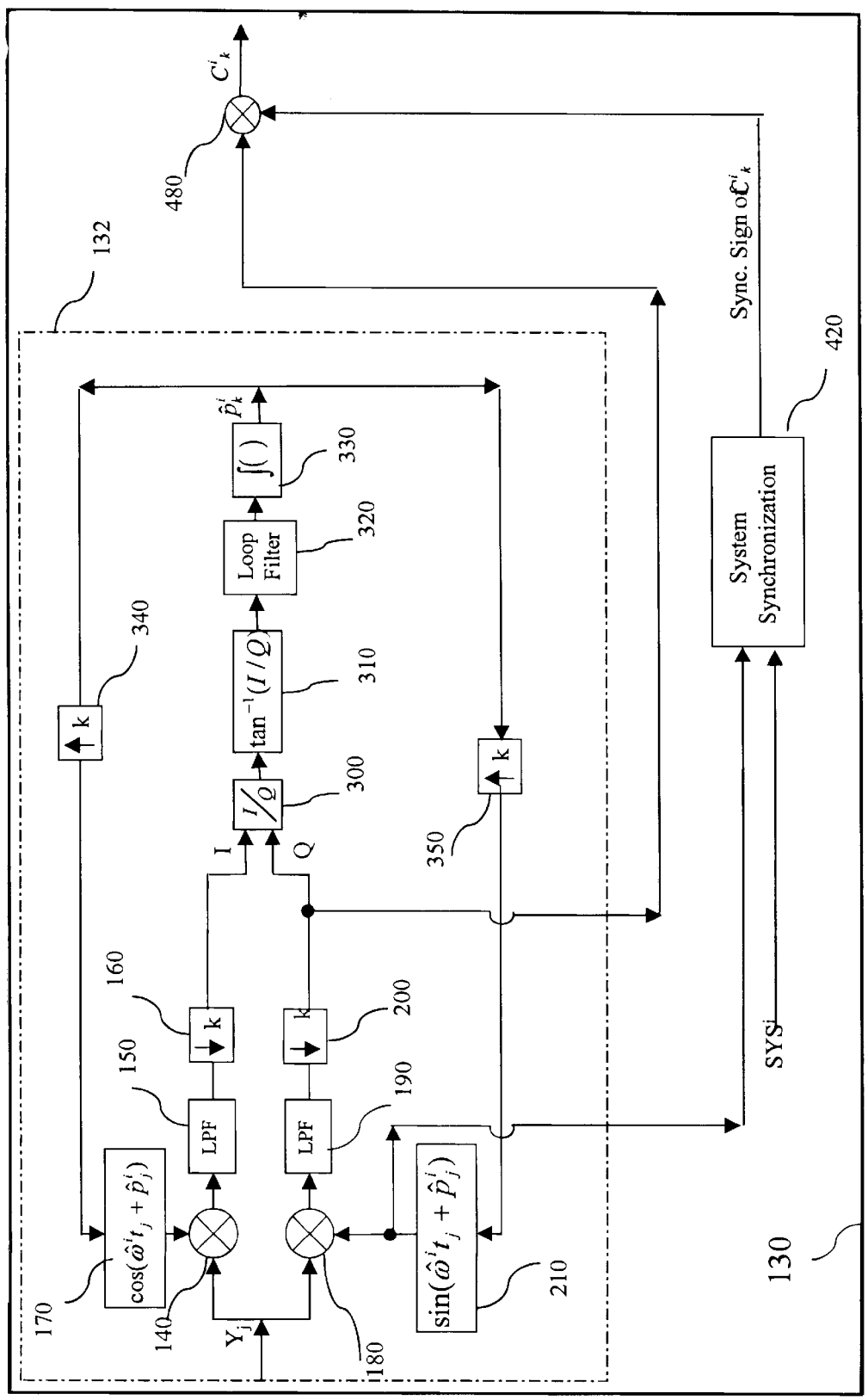
FIG. 9 is a simplified block diagram illustration of one of the envelope detecting (ED) modules of FIG. 8, constructed and operative in accordance with a preferred embodiment of the present invention.

Reference is now made to FIG. 9 which is a simplified block diagram illustration of the i'th envelope detecting (ED) module 130 of FIG. 8, constructed and operative accordance with a preferred embodiment of the present invention. In FIG. 9, the phase is denoted by the letter "p", rather than the more conventional φ, in order to prevent confusion between the letter φ which, in the present specification, is used to denote one of the angular coordinates.

The i'th envelope detector module (ED) 130 is operative to extract the strength of the electromagnetic interaction between the detector 41 and the i'th transmitter, from the electromagnetic signal received by the detector 41.

The input to the i'th ED module 130 is a time series $Y(t_j)$. This series is a superposition of the N sinusoidal waves, each amplitude modulated according to the relative position between the detector 41 and the i'th transmitter. The input sine series is defined by:

$$Y(t_j) = \sum_{i=1}^{N} C^i \sin(w^i t_j + p^i) \tag{19}$$

The output of the i'th ED module 130 is time-series of the i'th signed envelope $C^i(t_k)$. The envelope detection preferably is similar for all N transmitters, therefore only the detection of a single envelope is described below. The process is performed N times, i.e. once per transmitter, preferably in parallel, by N envelop-detector modules 130 respectively.

Each ED module typically comprises two sub-modules. These modules are: a PLL 132, described in detail below with reference to "Phase Locked Loops" by Roland E. Best et al. (McGraw Hill), and a system synchronization unit 420, is then used to define the absolute sign of the signal amplitude.

Reference is again made to FIG. 9 which is a simplified block diagram illustration of a PLL unit and a system synchronization sub-module.

The PLL unit of FIG. 9 is a control system that follows the phase and frequency of its input. Given the angular velocity $\omega^i$ of a sinusoidal waveform contained in its input signal, the PLL follows its phase and compensates for small frequency fluctuations. There are several well known PLL configurations. One such configuration useful for implementing the PLL unit of FIG. 9 is the Tanlock PLL, described in *Phase locked and Frequency Feedback Systems: Principles and Techniques,* J. Klapper and J. T. Frankle, Chapter 8, p. 256, Academic Press, New-York, 1972.

The system synchronization sub-module 420 is now described in more detail. The extraction of signed amplitude is possible if the initial phase of the carrier is known. Otherwise, no definitive decision can be made by the system to whether it is locked to the carrier or it is out of phase in respect to the signal. Therefore, an auxiliary synchronization mechanism 420 is preferably provided. At fixed intervals the ED 130 of FIG. 9 receives an auxiliary signal $SYS^i$. This synchronization signal ($SYS^i$) is one when the carrier is positive, and zero otherwise. When $SYS^i$ arrives, the output of 210 of FIG. 9, i.e., the PLL's estimated sine wave, is cross-correlated with $Y(t_j)$ to determine the absolute sign of each of the amplitudes $C^i(t_k)$.

Figure 10:
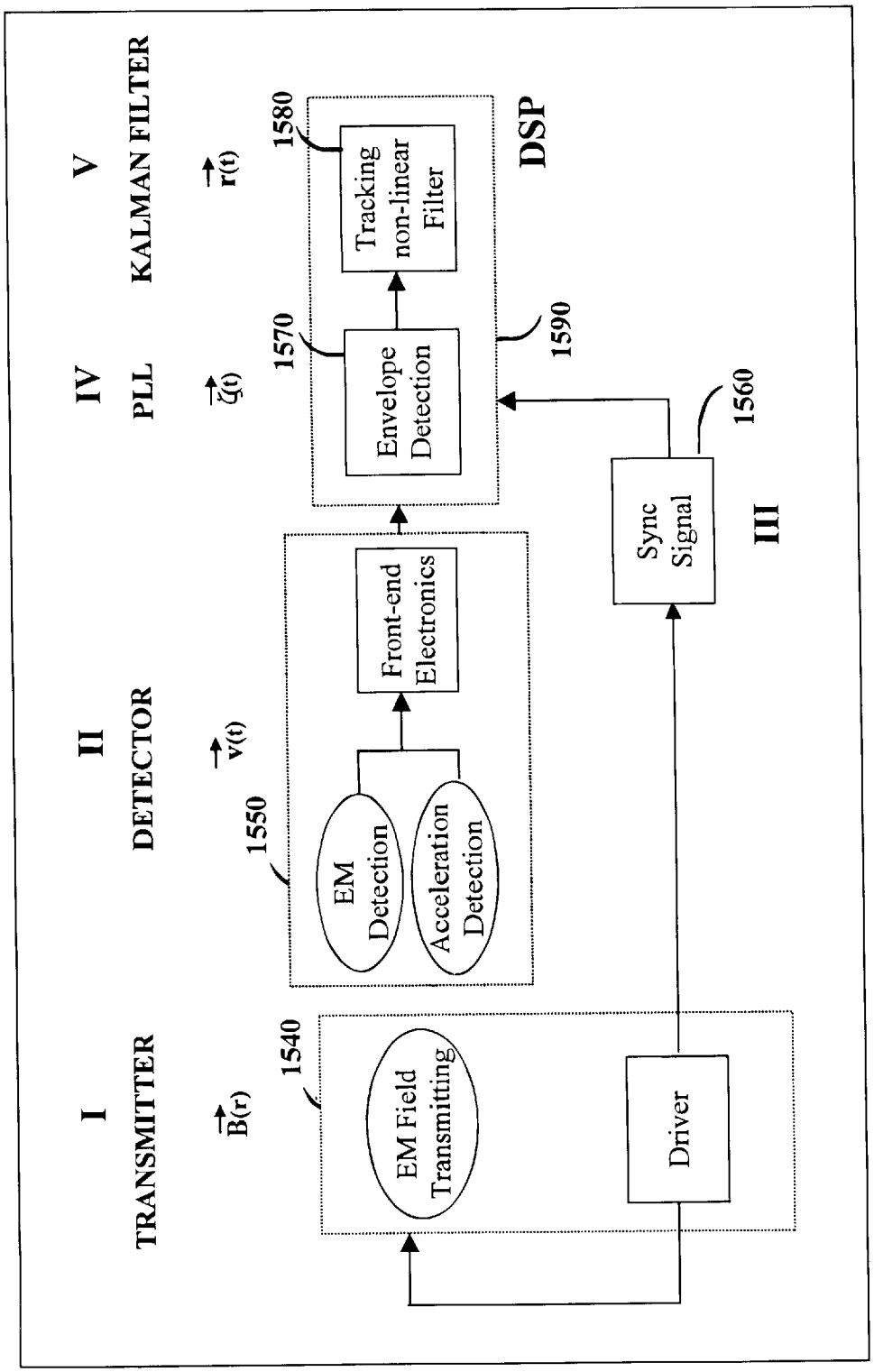
FIG. 10 is a simplified block diagram of an example of a tracking system, including of the electromagnetic field equations based EKF-type tracking filter operating in accordance with the method of FIG. 1.

FIG. 10 is a simplified block diagram of an example of a tracking system, including a field equation based EKF-type tracking filter, operating in accordance with the method of FIG. 11, and the method of FIG. 12, described below. As shown, the system of FIG. 10 preferably comprises the following functional units:

I. a transmission system (transmitter) 1540, including a number of electric coils and the electronic circuits that drive them (i.e. driver);
II. an acceleration detecting component and an electromagnetic (EM) detection system (EM detector) 1550. The electromagnetic detection device may include a coil and the electronic circuit that provides preprocessing, e.g., pre-amplification, gain control, and filtering;
III. a synchronization system 1560;
IV. an envelopes-detector 1570;
V. a tracking non-linear filter (tracker) 1580, which fuses magnetic and acceleration measures to estimate the sensor's pose.

Detector 1550 may be similar to the magnetic field detector 41 and signal conditioning and A/D conversion unit 64 of FIG. 2, as described hereinabove.

Synchronization system 1560 may be similar to a unit termed "system synchronization 420" of FIG. 9, as described hereinabove.

Envelopes-detector 1570 may be similar to a unit termed "envelope detector for determination of amplitudes $C^1, \ldots, C^N$ 114" of FIG. 7, as described hereinabove.

Tracking non-linear filter 1580 may be similar to a unit termed "position finding 116" of FIG. 7, as described hereinabove.

Each of transmitters 1540 may comprise a conventional solenoid, driven by an A/C current.

Figure 11:
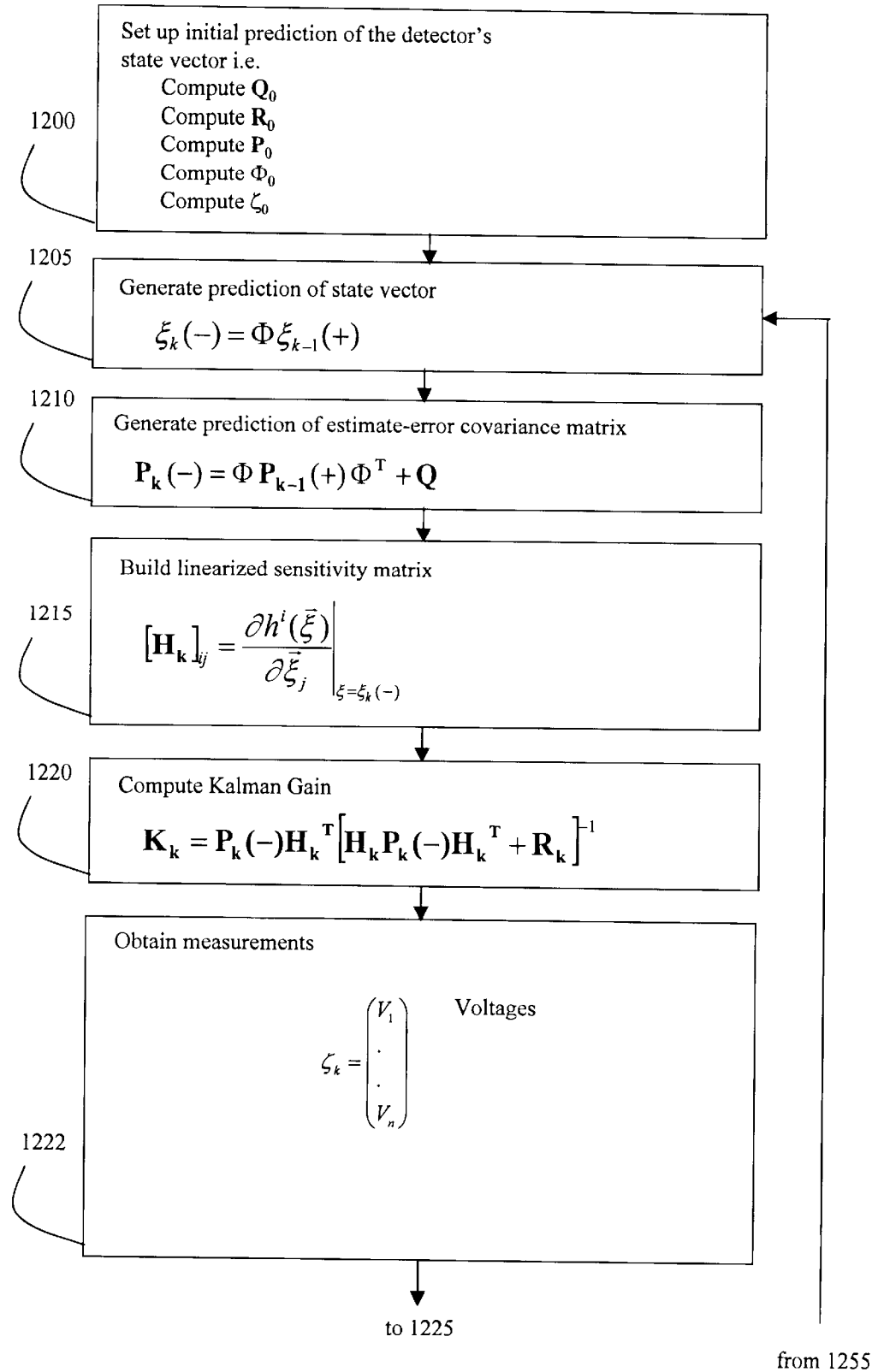
FIG. 11 is a simplified flow chart illustration of a preferred method of operation of the electromagnetic field equations based EKF-type tracking filter.
Figure 12:
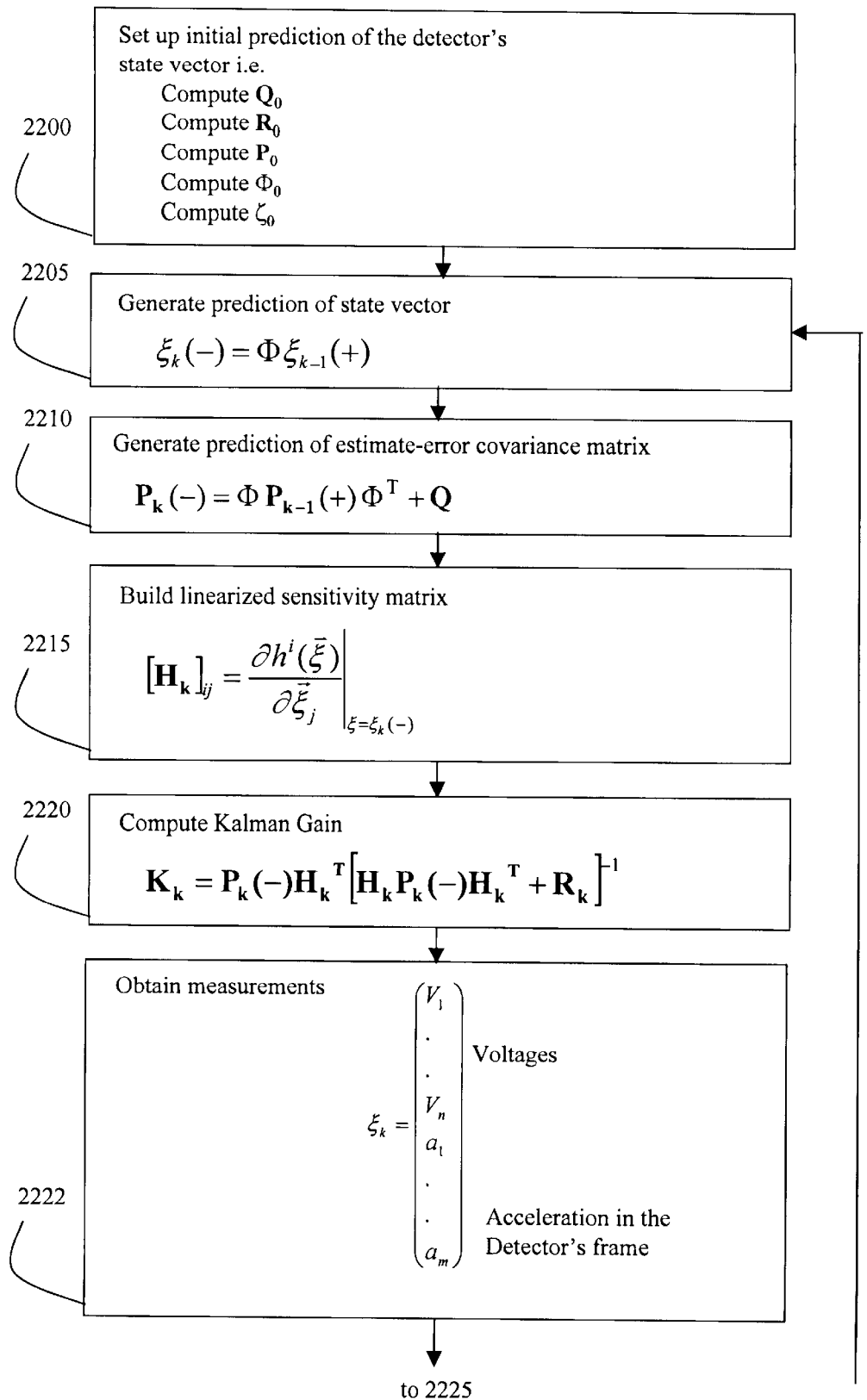
FIG. 12 is a simplified flow chart illustration of a preferred method of operation of the electromagnetic field equations based and acceleration based EKF-type tracking filter.

A preferred method of operation for a field equation based EKF-type tracking nonlinear filter 1580 is described herein in detail with reference to FIGS. 11 and FIG. 12. By way of example, a transmitter-array inducing magnetic fields is described. The superposition of these magnetic fluxes is described as being detected by a magnetic flux detector, and resolved to individual fluxes by an envelope detector. However, it is appreciated that this invention may employ other forms of flux induction and flux measurements.

Reference is now made to FIG. 11 which is a flow chart illustrating a preferred method of operation of the electromagnetic field equation based EKF-type tracking filter, without incorporation of acceleration measurements.

Figure 13:
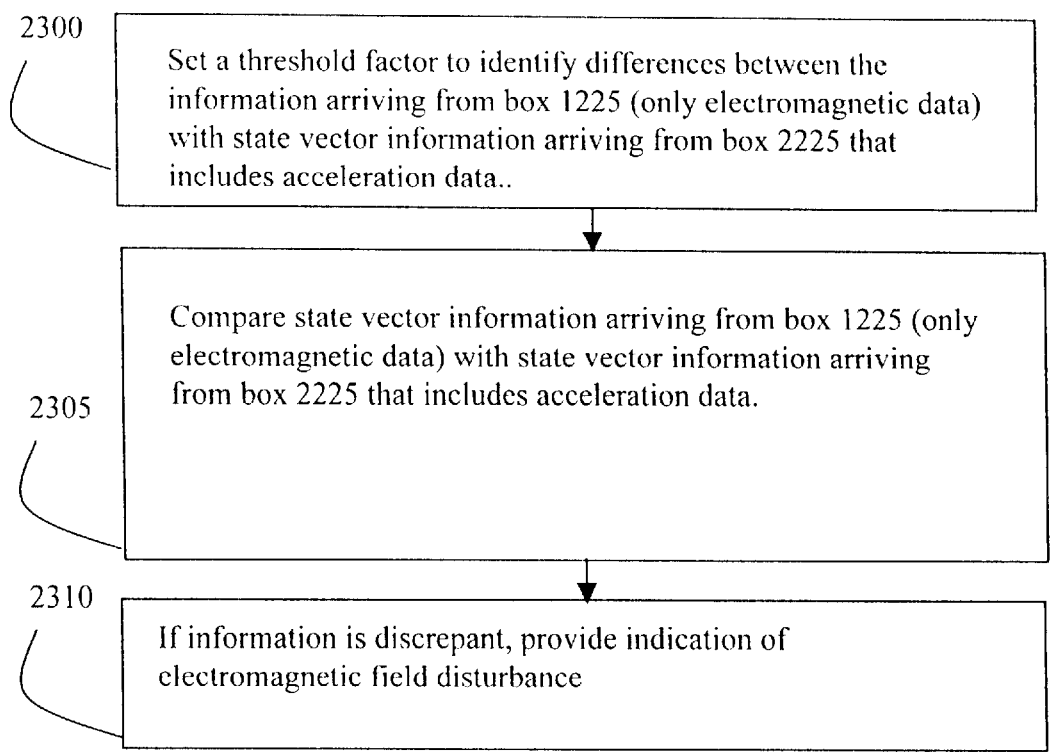
FIG. 13 is a block diagram illustrating the comparison between the results obtained by the electromagnetic based EKF the and the combined electromagnetic and acceleration based EKF to yield an indication for an electromagnetic disturbance.

Reference is now made to FIG. 12 which is a flow chart diagram of a preferred method of operation of the electromagnetic field equation based and accelerometer based EKF-type tracking filter, constructed and operative in accordance with a preferred embodiment of the present invention. In the embodiment of FIG. 12, the acceleration measurements are also included in the state vector of the system to obtain the spatial tracking based on EKF of the sensor and are used with reference to a parallel EKF that do not include the acceleration measurements in the state vector (as shown in FIG. 11). The two tracking results are then compared and the instantaneous differences between said tracking results are recorded and stored in the database 35 of FIG. 1. It is a particular feature of a preferred embodiment of the present invention that if the differences are above a certain threshold factor, an indication for a possible electromagnetic disturbance is operative and is sent to the control unit. This is schematically shown in FIG. 13. The threshold factor value is preferably set to be any value above the expected accuracy of the absolute positioning of the system and may usually be in the range of 0.1–10 mm or higher.

State Space Model of a Dynamic System

A conventional Kalman filter (KF) is a sequential and recursive tracker that generates an optimal estimate of the state of a linear system based on measures of the system, a model of the system's equations of motion and an estimate of its previous state. If the system of interest is not linear then an "EKF" (Extended Kalman Filter), one out of many variations of a KF, is preferably used.

A conventional KF uses several matrices to compute an optimal estimate to a state vector. These matrices are derived from the system equations of motion, e.g. as follows:
An approximation to the system dynamics is made:

$$0\xi(t) = F\xi(t) + w(t)$$

$$\zeta(t) = h[\xi(t)] + v(t) \tag{20}$$

In equation (37) $\xi(t)$ is a state vector, F is the differential equation coefficient matrix, w(t) is a system noise, $\zeta(t)$ is the measurements, h(●) is the measurement function, and v(t) is the measurement noise. h(●) is a vector function whose dimension is the number of measurements. The measurements ζ may be the same as the "C's" i.e. the output from the Envelope Detector 114 and the input of the Position Detector 116, of FIG. 7 and/or acceleration measurement. Both measurement-noise and system-noise are assumed invariant white Gaussian distributed processes, and are independent of each other.

The discrete time form of equation set above reads:

$$\xi_k = \Phi \xi_{k-1} + w_{k-1}$$
$$\zeta_k = h[\xi_k] + v_{k-1} \quad (21)$$

$\xi_k$ is the state vector at time-step k, $\Phi$ is the state transition matrix, $w_k$ is the system noise, h(●) is the measurement function, $\zeta_k$ is the measurement vector, and $v_k$ is the measurement noise, all at time bin k. The noises $w_k$ and $v_k$ are independent invariant Gaussian processes.

Any choice of a state vector is typically accepted providing it includes enough information to compute the desired position and orientation. One possible choice is:

$$\xi = [x, y, z, \phi, \theta, \psi, \dot{x}, \dot{y}, \dot{z}, \dot{\phi}, \dot{\theta}, \dot{\psi}, \ddot{x}, \ddot{y}, \ddot{z}, \ddot{\phi}, \ddot{\theta}, \ddot{\psi}] \quad (22)$$

where $\{x, y, z, \phi, \theta, \psi\}$ are the six coordinates of the detector's position and orientation as illustrated in FIG. 12, and a dot over a variable denotes the variable's time-derivative. The effect of higher-order derivatives is implicitly included within the system noise.

The KF is based on some knowledge of the statistics of Gaussian noises $w_k$ and $v_k$:

$$E(v_k v_i^T) = \delta_{k,i} R_k$$
$$E(w_k w_i^T) = \delta_{k,i} Q_k \quad (23)$$
$$E(w_k) = E(v_k) = 0$$

where $\delta_{k,i}$ denotes the Kronecker delta function.

Using an Extended Kalman Filter for Tracking

The measurement function $h_{EM}$(●) relates the induced voltage to the magnetic field and is known as the field equation law. In most cases it is difficult to express the field equation law in a closed form. Thus, an approximation is preferably made, the simplest of which is:

$$h(\xi)_{EM} = \frac{C_0}{|\vec{r}|^3} \left[ \frac{3}{|\vec{r}|^2} (\vec{n}_s \cdot \vec{r})(\vec{n}_d \cdot \vec{r}) - (\vec{n}_s \cdot \vec{n}_d) \right] \text{ with } \vec{r} = \vec{r}_s - \vec{r}_d \quad (24)$$

Figure 14:
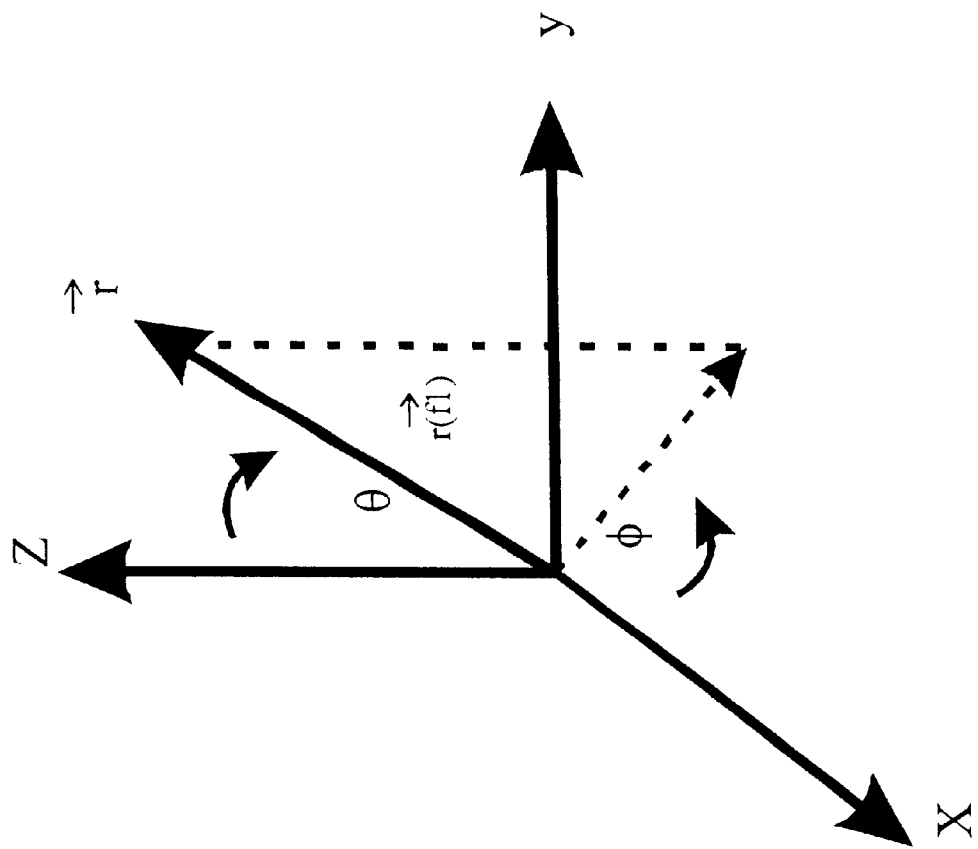
FIG. 14 is a vector diagram illustrating state vector orientations.
Figure 15:
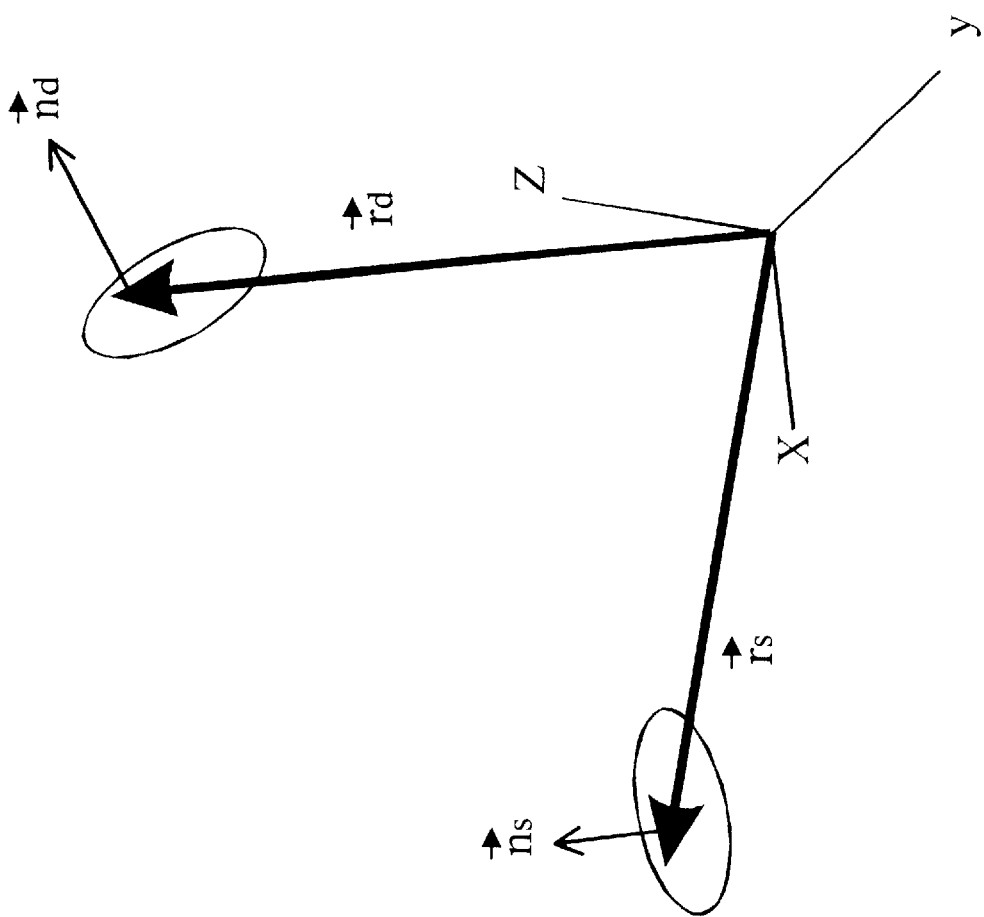
FIG. 15 is a vector diagram illustrating the field equation law.

$r_s$ and $r_d$ are the position vector of the transmitter and the detector, respectively and $n_s$ and $n_d$ are their corresponding plane unit vectors (the plane vector is a vector whose orientation is perpendicular to the plane), also known as as the normal vectors. These notations are depicted in FIG. 14. The function h(ξ) is a vector function, each of its components is the interaction with a single transmitter. For each component of the vector function the values of $r_s$, $n_s$, and $C_0$ take their corresponding values.

Similarly, the measurement function $h_{ACC}$(●) relates the sensor's accelerations in the fixed frame of reference with those of the sensor's frame. For the case of a tri-axial accelerometer it takes the explicit form:

$$h_{ACC}(\xi) = R(\phi, \theta, \psi) \cdot \vec{a}_{detector} \quad (25)$$

where $$\vec{a}_{detector} = R^{-1}(\phi, \theta, \psi)(a_{fixed} - g\hat{z})$$

and $$\vec{a}_{detector} = \begin{pmatrix} a_x^{detector} \\ a_y^{detector} \\ a_z^{detector} \end{pmatrix} \text{ and } \vec{a}_{fixed} = \begin{pmatrix} \ddot{x} \\ \ddot{y} \\ \ddot{z} \end{pmatrix} \quad (26)$$

where $a_{detector}$ is the acceleration of the sensor in the sensor's frame including the effect of the gravitational acceleration, $a_{fixed}$ is the acceleration in the fixed system, $g\hat{z}$ is the gravity contribution of the acceleration along the z direction (assuming this is the gravitational axis) as measured by the acceleration component and R is the Euler matrix given explicitly by:

$$R(\varphi, \theta, \psi) = \begin{pmatrix} \cos\varphi\cos\theta\cos\psi - \sin\varphi\sin\psi & -\cos\varphi\cos\theta\sin\psi - \sin\varphi\cos\psi & \cos\varphi\sin\theta \\ \sin\varphi\cos\theta\cos\psi + \cos\varphi\sin\psi & -\sin\varphi\cos\theta\sin\psi + \cos\varphi\cos\psi & \sin\varphi\sin\theta \\ -\cos\varphi\sin\theta & \sin\varphi\sin\theta & \cos\varphi \end{pmatrix} \quad (27)$$

Since R is orthogonal, then $R^{-1} = R^T$.

The function $h_{ACC}$ is needed in order to connect between the fixed-frame accelerations, which are part of the state vector, to the accelerations measured by the accelerometers in the sensor's frame.

The complete measurement vector composed of the separate electromagnetic signals and a single tri-axial accelerometer is:

$$h(\xi) = \begin{pmatrix} h_{EM} \\ h_{ACC} \end{pmatrix} \quad (28)$$

Operation of the tracker 1580 can be defined using any of several extensions to the Kalman filter. A preferred method utilizing an EKF is described hereinbelow, and is illustrated in FIG. 10. Similarly, the operation of the tracker 2580 can be defined using any of several extensions to the Kalman filter including the acceleration measurements. A preferred method utilizing the combination of the electromagnetic and acceleration measurements EKF is described herein below, and is illustrated in FIG. 12.

The procedure is an iterative one, providing successive estimates each based on the previous one. An initial computation 1200 typically provides five initial arrays: $Q_0$, $R_0$, $P_0$, $\Phi$, and $\xi_0$. The role of each is described below.

Given an estimate to the state vector at time step k−1, a prediction 1205 is made to the state vector at time k:

$$\xi_k(-) = \Phi \xi_{k-1}(+) \quad (29)$$

The notation (−) and (+) denote an estimation made prior to measurement taking (prediction) and after it (correction) respectively. For the state vector suggested in the equation above, the matrix $\Phi$ takes the form:

$$\phi_{ij} = \delta_{i,j} + T_s\delta_{i,j+6} + \frac{T_s^2}{2}\delta_{i,j+12} + \ldots \quad (30)$$

where $$T_s = t_k - t_{k-1} \quad (31)$$

A prediction 1210 is made to the estimate error covariance-matrix:

$$P_k(-) = \Phi P_{k-1}(+)\Phi^T + Q \quad (32)$$

The matrix Q in this example takes the form:

$$Q = \begin{pmatrix} 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & Q_{ax} & 0 & 0 & 0 & 0 & 0 \\ 0 & 0 & 0 & 0 & 0 & 0 & 0 & Q_{ay} & 0 & 0 & 0 & 0 \\ 0 & 0 & 0 & 0 & 0 & 0 & 0 & 0 & Q_{az} & 0 & 0 & 0 \\ 0 & 0 & 0 & 0 & 0 & 0 & 0 & 0 & 0 & Q_{a\varphi} & 0 & 0 \\ 0 & 0 & 0 & 0 & 0 & 0 & 0 & 0 & 0 & 0 & Q_{a\theta} & 0 \\ 0 & 0 & 0 & 0 & 0 & 0 & 0 & 0 & 0 & 0 & 0 & Q_{a\psi} \end{pmatrix} \quad (33)$$

A linear approximation 1215 is made to the measurement sensitivity function. For the state vector suggested in the equation set above, and in an example of a 9-transmitter system, this approximation becomes:

$$[H_k]_{ij} = \frac{\partial h^i(\vec{\xi})}{\partial \vec{\xi}_j}\bigg|_{\vec{\xi}=\vec{\xi}_k(-)} \quad (34)$$

where the term $[H_k]_{ij}$ denotes the derivative of the measurement function i with respect to $\xi_j$ taken at the coordinates estimated at time bin k. It should be appreciated that in our case the matrix H is not full and contains many null entries.

The following expression is used to compute the Kalman gain matrix 1220:

$$K_k = P_k(-)H_k^T[H_k P_k(-)H_k^T + R_k]^{-1} \quad (35)$$

For the example of a 9-magnetic transmitter and a single tri-axial accelerometer system, R may take the form:

$$R = (R_{EM}^1, R_{EM}^2, R_{EM}^3, R_{EM}^4, R_{EM}^5, R_{EM}^6, R_{EM}^7, R_{EM}^8, R_{EM}^9, R_{ACC}^1, R_{ACC}^2, R_{ACC}^3) \cdot I \quad (36)$$

where $R_{EM}^s$ denotes the covariance of the measurement error for transmitter s, and the measurement errors of different transmitters are assumed to be uncorrected. Similarly, $R_{ACC}^i$ is the measurement noise for the acceleration i, and we assume no cross correlation between the accelerations.

The gain 1220, in turn, may be used to make a correction 1225 to the predicted state vector 1205 and a correction 1230 to the predicted error covariance matrix 1210. The correction to the state vector 1225 may be a multiplication of the gain by the difference between the measurements and the predicted measurements based on the state vector (the innovations):

$$\xi_k(+) = \xi_k(-) + K_k\{\zeta_k - h[\xi_k(-)]\} \quad (37)$$

The correction to the error covariance matrix 1230 contains the gain 1220 and the derivative of the measurement sensitivity function 1215:

$$P_k(+) = [I - K_k H_k]P_k(-) \quad (38)$$

Thus, by providing initial approximations 1200 to the state vector, the error covariance matrix, $P_0$, and a model in terms of Q, R and h(●) a sequence of optimal estimates based on measurements $\zeta_k$ can be produced.

The exact values of initial arrays 1200 are not critical. The values of the matrices Q and R may be estimated from prior knowledge of the system, i.e., the elements of R are computed from the measurement noise and the value of Q from the expected accelerations in the system. $P_0$ may take any representative value, e.g., if a speed of five meters per second is expected, then the elements of $P_0$ relating to speed would take the value of twenty-five meters$^2$ per second$^2$. Similarly, $\xi_0$ may take the values of a typical state, e.g., if tracking is limited to a one-meter cube, and speed is limited to one meter per second, then $\xi_0$, may become a vector of ones.

Fusion of Measurement From Different Sources

In a preferred embodiment of the present invention, measurements of two different kinds are combined in order to obtain an accurate tracking. Preferably, both magnetic induction and acceleration measurements are used to find the pose of the detector using the EKF. The EKF is the preferred tool for such blending of measurements, which are taken with their optimal weights according to their errors. The combination of magnetic and acceleration measurements serves a threefold purpose. Firstly, the redundancy of measurements enhances the overall precision of the tracking, since adding measurements means adding information. Secondly, the accelerometers provide information, which enables us to estimate the spin angle ψ. Otherwise, it is impossible to estimate y using a single, circular magnetic coil in the sensor. Thirdly, the acceleration measurements are unaffected by magnetic disturbances, thus they provide accurate tracking when magnetic disturbances are strong. It is appreciated that the magnetic induction allows for a long-term tracking, which is affected by magnetic disturbances (e.g., induced eddy current, which creates a scattered magnetic field). However, magnetic induction does not suffer from drifts that accumulate in time. On the other hand, acceleration measurements are accurate only on short terms due to drifts, but are invulnerable to magnetic disturbances. Hence, the combination thereof gives a good working mix of measurements that reduces the effect of magnetic disturbances.

Using Redundant Measurements to Improve Tracking

The number of measurements necessary to provide precise tracking is an important practical issue. It is desirable to produce a system with a minimal number of transmitters and accelerometers to reduce the hardware production cost and to decrease the computational load. The reduction in computational load is because the heaviest computation in the whole process is the computation of the inverse operation in the equations above of step 1220, and the order of the inverted matrix equals the number of transmitters time detector's coils plus the number of measured accelerations.

To provide as precise a tracking as possible, increasing the number of measurements is desirable. In practice, a situation may arise when the knowledge about the parameters of one or more transmitters deteriorates, e.g., the position and orientation of a transmitter may change as a result of a mechanical shock, or its intensity may change as a result of electronics imperfection or temperature change. The same applies also to the accelerometers. With a multiple-measurements system, the Kalman filter would seek to provide an output that minimizes the errors, and a defective transmitter or accelerometer contributes some error. The larger the number of transmitters and accelerometers the smaller the weight of each in the error minimization, and the more precise the estimate. Thus, increasing the number of transmitters and/or accelerometers improves the tracking performance. In this respect the KF is the preferred tool to fuse together redundant measurements of different kinds.

It is a clear advantage of a preferred embodiment of the present invention that any number of transmitters and accelerometers may be easily incorporated into the system. Typically, this increase only requires a software change, preferably implemented at the detector's DSP 56,307 series.

Selecting State-vector Optimized for Tracking Problem

The state vector, given in the equation set above, contains three orientation coordinates—$\phi$, $\theta$ and $\psi$, the meaning of each is depicted in FIG. 12. A common choice for these coordinates is Euler zyz representation wherein the angle $\theta$ denotes the angle between the z-axis and the orientation vector, the angle $\phi$ is the angle between the x-axis and the projection of the orientation vector on the x-y plane and $\psi$ is the spin around the orientation vector. The angle $\theta$ ranges from zero to $\pi$ radians, and $\phi$ and $\psi$ range from zero to $2\pi$ radians. For numerical convenience and continuity purposes we let $\theta$ range from 0 to $2\pi$ as well.

Position and Orientation Acquisition Using Time Varying Filter

The non-linear filter described in the equations above assumes that a good initial estimate of the state vector is available, and further tracking proceeds through the prediction-correction iteration. If an initial estimate is not available, the filter may diverge. The divergence problem becomes more serious for non-linear applications since the initial state estimate may fall at a local minimum of the error function in phase space. Thus the detector-positioning problem is made of two probably separate problems: acquisition and tracking.

The exact position and orientation of the detector 1550 is never perfectly known. Thus, one would think that any initial estimate, albeit a poor one would serve to initiate the process. However, the consistency of the equations preferably should be preserved lest the filter diverge.

The filter preferably performs two interwoven operations: tracking the state vector and solving the Ricatti difference equation, i.e., numerically solving the difference equation for P. The Ricatti equation may be updated using equations (32) and (38), and the solution has only a weak feedback through its dependency on the estimate of the state-vector. Thus, it proceeds at its own pace with little regard to the accuracy of the results. The state vector estimate, on the other hand, makes use of the P matrix, assuming it is correct. If the initial guess is very poor, the Ricatti equation may converge and a small P emerges while the error is still very large. The filter would assume the error is small, and the process very stable, and a large gain may result. The large gain combined with large innovations may cause filter divergence.

To allow the Kalman filter to start with a poor initial guess, the Ricatti equation convergence is preferably slowed down, either by artificially keeping a large R, or a large Q. Large R results in a long integration time due to its location inside the inverse operation at the gain formula. Large Q keeps the steady-state solution large because Q is always added to the prediction.

As the filter proceeds, acquires more measurements, and produces better estimates, the large covariance matrices become an obstacle. Once a precise estimate is available, a small R is preferred, allowing an even tighter estimate and thus fully exploiting the measurements. The filter preferably requires a mechanism allowing switching from an acquisition mode, in which convergence is dominant to a tracking mode, in which convergence is ensured, and precision becomes more important. The switch is preferably smooth, as sudden changes in filter parameters may also be catastrophic.

These considerations lead to a solution of time-varying parameters 1245. At startup, when the state vector is only poorly known, large R and Q along with large initial P are supplied. R and Q, however, comprise a component that is allowed to decay exponentially, leaving only the component that better reflects the real noises of the system. For example, the time dependence of R and Q may take the form:

$$Q_k^{dec} = Q_{k+1}^{dec} e^{-\frac{T_k - T_{k-1}}{\tau_{decay}}} \quad (39)$$

$$Q_k = Q_k^{dec} + Q^{inf}$$

$$R_k^{dec} = R_{k+1}^{dec} e^{-\frac{T_k - T_{k-1}}{\tau_{decay}}} \quad (40)$$

$$R_k = R_k^{dec} + R^{inf}$$

The choice of $Q^{dec}$ and $R_{dec}$ is arbitrary, and needs to be tuned according to, e.g., the specifications of the system. As a possibility, one can choose:

$$Q_1^{dec} = \alpha Q^{inf} \quad (41)$$

$$R_1^{dec} = \beta R^{inf}$$

Where $\alpha$ and $\beta$ are (typically large) numbers. Alternatively, for $R^{dec}$, one can use the following scheme which takes into account local features of the gain matrix:

$$R_k^{dec} = R_k^{adaptive} e^{\frac{T_k - T_{k-1}}{\tau_{decay}}} \quad (42)$$

where $R_k^{adaptive}$ is a diagonal matrix given by:

$$R_k^{adaptive} = \delta_k I \quad \text{with} \quad \delta_k = \frac{1}{N_m} \sqrt{\text{Trace}(H_k P_k^- H_k^T)^2} \quad (43)$$

with $N_m$ the number of measures.

P, of course, gradually decays as a result of the Ricatti solution. R and Q may be allowed to decay with a time constant of several hundred milliseconds in order to allow successful and smooth transition from acquisition into tracking when no information about the state vector is initially available. As described in more detail below, due to initialization limitations of the Kalman Filter, a complementary positioning unit is typically provided which is robust even at initialization.

Use of Self-calibration

The precision of the tracking based on equations (21)–(38) depends upon precise knowledge of the position and orientation of all the transmitters. The six-coordinate position and orientation of each transmitter is preferably known along with its intensity and radius. The position and orientation is used to compute the dipole magnetic field, the intensity contributes to the proportionality factor $C_0$, and the radius is used in order to compute the correction to the dipole term in the equations above. Each of these parameters may be directly measured producing successful calibration. In practice, a precise calibration is tedious and sometimes limited, e.g. measuring the physical dimensions of an electric coil encased within a plastic protection shield is difficult. Moreover, almost every parameter is subject to some variance due to temperature changes. Thus, it is desirable to provide the system with a gross calibration, and allow it to fine-tune the parameters automatically.

In the calibration of the proportionality coefficient $C_0$, a direct measure of $C_0$ is possible. The higher the desired accuracy, the more time consuming is the experiment. Alternatively, a state member $C_i$ for each transmitter may be added, and a new Kalman filter built that optimizes these parameters. The new state vector preferably takes the form:

$$\xi = x, y, z, \phi, \theta, \psi, \dot{x}, \dot{y}, \dot{z}, \dot{\phi}, \dot{\theta}, \dot{\psi}, \ddot{x}, \ddot{y}, \ddot{z}, \ddot{\phi}, /|\$]\$¨g\ddot{v}, \ddot{\psi},$$
$$C_1, \ldots, C_N \quad (44)$$

N = number of transmitters

When the state vector is augmented, the matrices $P_0$, Q and $\Phi$ are also preferably augmented:

$$Q = \begin{bmatrix} Q_{coor} & 0 \\ 0 & Q_{sc} \end{bmatrix} \quad (45)$$

where $Q_{coor}$ is the matrix defined as Q above, and $Q_{sc}$ is the self-calibration process-noise covariance-matrix. This matrix may be computed from the maximal allowed rate of change of the coefficients $C_0$ or be set to zero if a constant calibration is sought. The state transition matrix preferably takes the form:

$$\Phi = \begin{bmatrix} \Phi_{coor} & 0 \\ 0 & \Phi_{sc} \end{bmatrix} \quad (46)$$

where $\Phi_{coor}$ is the matrix defined as $\Phi$ above, and $\Phi_{sc}$ is the coefficients transition matrix. This latter part typically equals the unity matrix unless a time derivative of the coefficients $C_0$ is included in the state.

The matrices K and H are also preferably augmented. To this end the derivative of $h(\xi)$ with respect to the new state members is typically required. The derivative may be analytically or numerically computed from the above equations, depending upon which is more convenient or computationally faster. The sub-matrix of $P_0$ depends on the size of calibration uncertainty. For the example of self-calibrating for a nine-sources case, the coefficient $C_0$, the H matrix takes the form:

$$H_k = [H_{coor} \quad H_{sc}] \quad (47)$$

-continued $$H_{sc} = \begin{pmatrix} h^1_{C,k} & 0 & 0 & 0 & 0 & 0 & 0 & 0 & 0 \\ 0 & h^2_{C,k} & 0 & 0 & 0 & 0 & 0 & 0 & 0 \\ 0 & 0 & h^3_{C,k} & 0 & 0 & 0 & 0 & 0 & 0 \\ 0 & 0 & 0 & h^4_{C,k} & 0 & 0 & 0 & 0 & 0 \\ 0 & 0 & 0 & 0 & h^5_{C,k} & 0 & 0 & 0 & 0 \\ 0 & 0 & 0 & 0 & 0 & h^6_{C,k} & 0 & 0 & 0 \\ 0 & 0 & 0 & 0 & 0 & 0 & h^7_{C,k} & 0 & 0 \\ 0 & 0 & 0 & 0 & 0 & 0 & 0 & h^8_{C,k} & 0 \\ 0 & 0 & 0 & 0 & 0 & 0 & 0 & 0 & h^9_{C,k} \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{pmatrix} \quad (48)$$

$$h^s_{C,k} = \frac{\partial h^s(\xi)}{\partial C^s_0}\bigg|_{\xi_k(-)} = \frac{h^s[\xi_k(-)]}{C^s_0} \quad (49)$$

with $C_0^s$ the coefficient of transmitter s.

Similarly, one may add state members for calibration of other parameters. For example, considering the $\phi$ orientation of the sources:

$$\xi = x, y, z, \phi, \theta, \psi, \dot{x}, \dot{y}, \dot{z}, \dot{\phi}, \dot{\theta}, \dot{\psi}, \ddot{x}, \ddot{y}, \ddot{z}, \ddot{\phi}, /|\$]\$¨g\ddot{v}, \ddot{\psi},$$
$$\phi^s_1, \ldots, \phi^s_N \quad (50)$$

$\phi^s_i$ = coordinate of transmitter i

N = number of transmitters or any combination of source calibration parameters. For each combination, the matrices $P_0$, Q and $\Phi$, are preferably accordingly built.

Of equal importance are self-calibrations related to the acceleration measurements.

For example, one can write $h_{ACC}$ as:

$$h_{ACC} = AR(\varphi, \theta, \psi)\begin{pmatrix} a_x \\ a_y \\ a_z - g\hat{z} \end{pmatrix} \quad (51)$$

Here a is a scale factor, which can be not known accurately, or may vary slowly with the temperature. Similarly to the other self-calibrations presented above, we can add a to the state vector and apply self-calibration. The same applies to other parameters of the accelerometers such as bias.

When self-calibration is used, the system's knowledge of the transmitters' calibration data is preferably updated using the state vector 1255. Preferably, this update takes place after every iteration. However, a slower update rate may be used if only small updates are expected.

The preferred embodiment of the present invention described hereinabove considers only an EKF, i.e., first order approximation to an optimal non-linear filter. Improved filters (e.g. as described in Kushner, 1967), including second order EKF and Gaussian filters (both described in Jazwinski, 1970) and Gaussian sum filters (described in Anderson and Moore, 1979), and other versions, of the known approximations can be applied in alternative embodiments of the present invention, and their derivation is straightforward.

The system of the present invention preferably includes a first RF channel from the sensors to the base unit over which the sensors convey information to the base unit. This information typically comprises position information including spatial and angular position coordinates, plus a self-identifying header identifying the sensor which is sending this information and a correction code. Preferably, a second RF channel is provided between the base unit 30 and the sensors. This channel is used to synchronize the sensors by communicating to at least the relevant sensors whether at least the relevant transmitters are currently in phase or in anti-phase, relative to a known initial phase.

To run the software implementation of Appendix I, the following steps may be performed:
(a). Generate an ASCII file containing the contents of Appendix I.
(b). Install the Matlab software package, marketed by Mathworks, Inc., in a personal computer under a suitable operating system such as MS-Windows.
(c). Provide an input file. Appendix II is an example of a suitable file.
(d). Run the script of (a).

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A system for indicating a disturbance in an electromagnetic field, the system comprising:
    a plurality of transmitters operative to transmit a corresponding plurality of alternating electromagnetic fields within a three-dimensional space; and
    at least one sensor arranged to be fixed to at least one corresponding portion of a moving object whose position it is sought to monitor, each of said at least one sensors comprising:
        an electromagnetic field receiver having at least one active axis and operative to receive at least one component, lying along the at least one active axis respectively, of each of the plurality of alternating electromagnetic fields;
        an accelerometer operative to independently measure at least one component of the acceleration of the moving object; and
        a digital signal processor for storing at least one characteristic of each of the plurality of electromagnetic fields as received by the electromagnetic field receiver, and at least one characteristic of the acceleration as measured by the accelerometer,
    wherein said digital signal processor is adapted to
        transmit the at least one stored characteristic of each of the plurality of electromagnetic fields to a Kalman filter and calculate therefrom a first estimate of at least one component of the position and orientation of the moving object;
        transmit the at least one stored characteristics of each of the plurality of electromagnetic fields and the at least one characteristic of the acceleration as measured by the accelerometer to the Kalman filter, and calculate therefrom a second estimate of at least one component of the position and orientation of the moving object; and
        compare said first and second estimates for a discrepancy indicating a disturbance in the electromagnetic field,
    wherein a discrepancy indicating a disturbance in the electromagnetic field comprises a discrepancy of greater than the expected absolute accuracy of the measurement of the position and orientation of the moving object.

2. A system according to claim 1 wherein said digital signal processor compares said first and second estimates for a discrepancy indicating a disturbance in the electromagnetic field on a periodic basis.

3. A system according to claim 1 wherein said at least one component of the position of the moving object comprises at least two components.

4. A system according to claim 3 wherein said at least two components of the position of the moving object comprise three components.

5. A system according to claim 1 wherein said at least one component of the position of the moving object is selected from the group consisting of the x, y, and z coordinates of the moving object.

6. A system according to claim 1 wherein said at least one component of the acceleration of the moving object comprises at least two components.

7. A system according to claim 6 wherein said at least two components of the acceleration of the moving object comprise three components.

8. A system according to claim 1 wherein said at least one component of the acceleration of the moving object is selected from the group consisting of the $a_x$, $a_y$, and $a_z$ acceleration components of the moving object.

9. A system according to claim 1 wherein the Kalman filter calculating the second estimate of at least one component of the position and orientation of the moving object employs at least one estimate of an acceleration value's components in order to compute an estimate of said at least one component of the moving object's position and orientation, and wherein the Kalman filter employs said at least one independently measured component of the acceleration of the moving object as said at least one estimated acceleration value's components, rather than deriving said at least one estimated acceleration value's components from the electromagnetic field information.

10. A system according to claim 9 wherein employing said at least one independently measured component of the acceleration of the moving object as said at least one estimated acceleration value's components improves the accuracy of the estimate of the at least one component of the position and orientation of the moving object.

11. A system according to claim 9 wherein the electromagnetic field receiver comprises a single axis electromagnetic field receiver, and wherein the accelerometer is attached thereto, such that employing said at least one independently measured component of the acceleration of the moving object as said at least one estimated acceleration value's components provides information about the axial rotation of the moving object.

12. A method for indicating a disturbance in an electromagnetic field, the method comprising:
    positioning a plurality of transmitters operative to transmit alternating electromagnetic fields within a three-dimensional space; and affixing at least one sensor to at least one corresponding portion of a moving object whose position it is sought to monitor, each of said at least one sensor comprising:
an electromagnetic field receiver having at least one active axis and operative to receive at least one component, lying along the at least one active axis respectively, of the alternating electromagnetic fields; and
an accelerometer operative to independently measure at least one component of the acceleration of the moving object;
storing at least one characteristic of the electromagnetic fields as received by the electromagnetic field receiver, and at least one characteristic of the acceleration as measured by the accelerometer,
transmitting the at least one stored characteristic of the electromagnetic fields to a Kalman filter and calculating therefrom a first estimate of at least one component of the position and orientation of the moving object;
transmitting the at least one stored characteristic of the electromagnetic field and the at least one characteristic of the acceleration as measured by the accelerometer to the Kalman filter, and calculating therefrom a second estimate of at least one component of the position and orientation of the moving object; and
comparing said first and second estimates for a discrepancy indicating a disturbance in the electromagnetic field,
wherein a discrepancy indicating a disturbance in the electromagnetic field comprises a discrepancy of greater than the expected absolute accuracy of the measurement of the position and orientation of the moving object.

13. A method according to claim 12 wherein said comparing said first and second estimates for a discrepancy indicating a disturbance in the electromagnetic field occurs on a periodic basis.

14. A method according to claim 12 wherein said at least one component of the position of the moving object comprises at least two components.

15. A method according to claim 14 wherein said at least two components of the position of the moving object comprise three components.

16. A method according to claim 12 wherein said at least one component of the position of the moving object is selected from the group consisting of the x, y, and z coordinates of the moving object.

17. A method according to claim 12 wherein said at least one component of the acceleration of the moving object comprises at least two components.

18. A method according to claim 17 wherein said at least two components of the acceleration of the moving object comprise three components.

19. A method according to claim 12 wherein said at least one component of the acceleration of the moving object is selected from the group consisting of the $a_x$, $a_y$, and $a_z$ acceleration components of the moving object.

20. A method according claim 12 wherein calculating the second estimate of at least one component of the position and orientation of the moving object comprises employing at least one estimate of an acceleration value's components in order to compute an estimate of said at least one component of the moving object's position and orientation, and employing said at least one independently measured component of the acceleration of the moving object as said at least one estimated acceleration value's components, rather than deriving said at least one estimated acceleration value's components from the electromagnetic field information.

21. A method according to claim 20 wherein employing said at least one independently measured component of the acceleration of the moving object as said at least one estimated acceleration value's components improves the accuracy of the estimate of the at least one component of the position and orientation of the moving object.

22. A method according to claim 20 wherein the electromagnetic field receiver comprises a single axis electromagnetic field receiver, and wherein the accelerometer is attached thereto, such that employing said at least one independently measured component of the acceleration of the moving object as said at least one estimated acceleration value's components provides information about the axial rotation of the moving object.

23. A method according to claim 12 wherein said plurality of transmitters are operative to transmit a corresponding plurality of alternating electromagnetic fields within a three-dimensional space,
said electromagnetic field receiver is operative to receive at least one component, lying along the at least one active axis respectively, of each of the plurality of alternating electromagnetic fields; and
said storing step comprising storing at least one characteristic of each of the plurality of electromagnetic fields as received by the electromagnetic field receiver.

24. A system according to claim 1 wherein an electromagnetic interaction occurs between each of the plurality of transmitters, and at least one sensor, and wherein the digital signal processor is also operative to extract the strength of the electromagnetic interaction between each of the plurality of transmitters and at least one sensor, from the electromagnetic signal received by the at least one sensor.

25. A system according to claim 1 wherein said digital signal processor comprises an envelope detector module operative to determine received signed envelope amplitude values for each of a plurality of electromagnetic signals received from the plurality of transmitters; and
a position determination unit operative, based on the signed amplitude values determined by the envelope detector module, to provide an output indication of the positions of each electromagnetic field receiver.

26. A system according to claim 25 wherein said envelope detector module comprises a plurality of envelope detectors each including a phase locked loop, (PLL).

* * * * *